United States Patent
Drill et al.

(10) Patent No.: US 9,568,091 B2
(45) Date of Patent: Feb. 14, 2017

(54) ACTIVE TRANSFER CASE WITH SPLASH RECOVERY CLUTCH LUBRICATION SYSTEM

(71) Applicant: Magna Powertrain of America, Inc., Troy, MI (US)

(72) Inventors: Daniel M. Drill, Rochester, MI (US); Borin Reth, Rochester, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 89 days.

(21) Appl. No.: 14/718,798

(22) Filed: May 21, 2015

(65) Prior Publication Data

US 2016/0341300 A1  Nov. 24, 2016

(51) Int. Cl.

| | |
|---|---|
| *F16H 37/06* | (2006.01) |
| *F16H 37/02* | (2006.01) |
| *F16H 57/04* | (2010.01) |
| *F16H 7/02* | (2006.01) |
| *B60K 17/344* | (2006.01) |
| *F16D 13/52* | (2006.01) |
| *F16D 13/74* | (2006.01) |
| *F16D 13/76* | (2006.01) |

(52) U.S. Cl.
CPC ......... *F16H 57/0457* (2013.01); *B60K 17/344* (2013.01); *F16D 13/52* (2013.01); *F16D 13/74* (2013.01); *F16D 13/76* (2013.01); *F16H 7/023* (2013.01); *F16H 37/065* (2013.01); *F16H 57/045* (2013.01); *F16H 57/0427* (2013.01); *F16H 57/0473* (2013.01)

(58) Field of Classification Search
CPC ............................ F16H 37/021; F16H 61/662
USPC ......................................... 74/665 G, 665 GE
See application file for complete search history.

(56) References Cited

U.S. PATENT DOCUMENTS

| | | | |
|---|---|---|---|
| 4,971,184 A | 11/1990 | Lederman | |
| 5,620,072 A * | 4/1997 | Engle | B60K 17/342 180/247 |
| 6,155,395 A * | 12/2000 | Braford, Jr. | F16D 47/00 180/247 |
| 6,780,132 B2 * | 8/2004 | Cook | B60K 17/35 180/247 |
| 6,793,603 B2 | 9/2004 | Teraoka et al. | |
| 6,821,227 B2 * | 11/2004 | Williams | B60K 17/3467 475/204 |
| 7,753,173 B2 | 7/2010 | Gratzer et al. | |
| 8,091,451 B2 | 1/2012 | Wolfsjäger et al. | |
| 8,157,072 B2 | 4/2012 | Bowen | |
| 8,316,738 B2 | 11/2012 | Hellinger et al. | |
| 8,650,980 B2 | 2/2014 | Lafer et al. | |

(Continued)

FOREIGN PATENT DOCUMENTS

| | | |
|---|---|---|
| DE | 102007057984 A1 | 6/2009 |
| DE | 102014207317 A1 | 10/2015 |

(Continued)

*Primary Examiner* — Ha D Ho
(74) *Attorney, Agent, or Firm* — Dickinson Wright PLLC

(57) ABSTRACT

An active transfer case is disclosed having a multi-plate friction clutch installed on the front output shaft. A splash recovery clutch lubrication system is provided to capture lubricant splashed from the sump in response to rotation of the friction clutch and transfer the captured lubricant to a central clutch feed chamber to cool and lubricate the components of the friction clutch.

21 Claims, 17 Drawing Sheets

(56) References Cited

U.S. PATENT DOCUMENTS

| | | |
|---|---|---|
| 8,678,158 B2 | 3/2014 | Sachsenmaier et al. |
| 2003/0106734 A1* | 6/2003 | Nagai .................... F16H 15/38 |
| | | 180/233 |
| 2010/0065395 A1 | 3/2010 | Baer et al. |
| 2011/0036677 A1 | 2/2011 | Kriebernegg et al. |
| 2014/0174877 A1 | 6/2014 | Penz et al. |
| 2015/0060228 A1 | 3/2015 | Francis et al. |

FOREIGN PATENT DOCUMENTS

| | | |
|---|---|---|
| DE | 102014207319 A1 | 10/2015 |
| WO | WO2009035678 A1 | 3/2009 |
| WO | WO2013041409 A1 | 3/2013 |

* cited by examiner

ACTIVE TRANSFER CASE WITH SPLASH RECOVERY CLUTCH LUBRICATION SYSTEM

FIELD

The present disclosure relates generally to power transfer systems for controlling the distribution of drive torque from a powertrain to the front and rear drivelines of a four-wheel drive motor vehicle. More particularly, the present disclosure is directed to a transfer case having a front output shaft equipped with a mode clutch and a splash recovery clutch lubrication system.

BACKGROUND

This section provides background information related to the present disclosure which is not necessarily prior art.

In view of increased consumer popularity in four-wheel drive vehicles, power transfer systems are currently being utilized in vehicular drivetrain applications for selectively directing power (i.e., drive torque) from the powertrain to all four wheels of the vehicle. In many power transfer systems, a transfer case is incorporated into the drivetrain and is operable in a four-wheel drive mode for delivering drive torque from the powertrain to both the front and rear wheels. Many conventional transfer cases are equipped with a mode shift mechanism that can be selectively actuated to shift between a two-wheel drive mode and a locked four-wheel drive mode. In addition, many transfer cases also include a range shift mechanism which can be selectively actuated by the vehicle operator for shifting between four-wheel high-range and low range drive modes.

It is also known to use "on-demand" power transfer systems for automatically distributing drive torque between the front and rear wheels, without any input or action on the part of the vehicle operator, when traction is lost at either the front or rear wheels. Modernly, it is known to incorporate the "on-demand" feature into a transfer case by replacing the mechanically-actuated mode shift mechanism with a multi-plate friction clutch assembly and a power-operated clutch actuator that are interactively associated with an electronic control system and a sensor arrangement. During normal road conditions, the friction clutch assembly is typically maintained in a released condition such that drive torque is only delivered to the rear wheels. However, when the sensors detect a low traction condition, the clutch actuator is actuated to engage the friction clutch assembly for transmitting drive torque "on-demand" to the front wheels. Moreover, the amount of drive torque transferred through the friction clutch assembly to the front wheels can be varied as a function of specific vehicle dynamics and operating characteristics, as detected by the sensor arrangement.

A majority of current on-demand transfer cases are configured to include a rear output shaft interconnecting the transmission output to the rear driveline, a front output shaft interconnected to the front driveline, a transfer assembly driven by the front output shaft, and the friction clutch assembly which is operably arranged to couple the transfer assembly to the rear output shaft for transmitting drive torque to the front driveline. Typically, the transfer assembly includes a first sprocket rotatably supported on the rear output shaft, a second sprocket fixed to the front output shaft, and a chain encircling and drivingly interconnecting the first sprocket for common rotation with the front output shaft. The friction clutch assembly and components of the power-operated clutch actuator are disposed to surround the rear output shaft and function to couple the first sprocket to the rear output shaft. Examples of such on-demand or "active" transfer cases are disclosed in U.S. Pat. Nos. 8,091,451; 8,316,738; and 8,678,158.

Such active transfer cases also require a lubrication system for lubricating the clutch assembly and other rotary components mounted on the rear output shaft. A sump of lubricant is maintained in a lower portion of the transfer case so as to typically submerge at least a portion of the second sprocket. A passive lubrication system utilizes lubricant splashed throughout the transfer case upon rotation of the sprockets to lubricate the rotary components and cool the clutch assembly. Examples of transfer cases equipped with passive lubrication systems are shown in U.S. Pat. Nos. 7,753,173 and 8,650,980. As an alternative, a shaft-driven lube pump, such as a gerotor pump, can be operably associated with the rear output shaft to pump lubricant from the sump and distribute the lubricant in response to rotation of the rear output shaft. Finally, it is also known to equip the transfer case with an electric lube pump that can be controlled to provide adaptive lubricant flow.

In the past, the vehicle ride height and suspension configuration of many trucks and sport utility vehicles provided sufficient packaging volume for such traditional active transfer cases. However, in view of increased demand for smaller four-wheel drive vehicles, the packaging volume allocated to the powertrain and the transfer case has been greatly reduced. As such, some transfer cases have been developed which position the friction clutch assembly and the power-operated clutch actuator on the front output shaft. One example of such one-speed on-demand transfer cases can be seen in U.S. Pat. No. 8,157,072.

While such alternative transfer cases address the need for reduced packaging requirements, a need still exists to advance the technology and structure of transfer cases to provide enhanced arrangements that improve upon the prior art.

SUMMARY

This section provides a general summary of the disclosure and is not intended to be interpreted as a complete and comprehensive disclosure of all of its features, advantages, objectives and aspects.

It is an aspect of the present disclosure to provide an active transfer case for use in four-wheel drive vehicles that is operable to transmit drive torque through a multi-plate friction clutch assembly and which includes a splash recovery clutch lubrication system.

It is a related aspect of the present disclosure to provide an active transfer case having the multi-plate friction clutch assembly and the splash recovery clutch lubrication system operably associated with a front output shaft.

It is another related aspect of the present disclosure to provide an active transfer case equipped with the splash recovery clutch lubrication system and which includes an oil metering mechanism for controlling the delivery of lubricant to the multi-plate friction clutch assembly.

In view of these and other aspects and objectives of the present disclosure, a two-speed active transfer case is provided and includes an input shaft adapted to receive drive torque from a powertrain, a rear output shaft adapted for connection to a rear driveline and aligned with the input shaft for rotation about a first rotary axis, a front output shaft adapted for connection to a front driveline and aligned for rotation about a second rotary axis, a transfer mechanism driven by the rear output shaft, a two-speed range mechanism operably disposed between the input shaft and the rear output shaft, a range shift mechanism for controlling operation of the two-speed range mechanism, a mode mechanism operably disposed between the transfer mechanism and the front output shaft, a mode shift mechanism for controlling operation of the mode mechanism, and a splash recovery lubrication system associated with the front output shaft and configured to capture lubricant splashed by rotation of components associated with the transfer mechanism and/or the mode mechanism and feed such captured lubricant to the mode mechanism.

In accordance with one embodiment, the two-speed active transfer case of the present disclosure includes a mode mechanism configured as a friction clutch assembly at least partially disposed in a sump of lubricant and having a first clutch member driven by a transfer component of the transfer mechanism, a second clutch member driven by the front output shaft, and a multi-plate clutch pack disposed therebetween. The splash recovery lubrication system includes an oil catcher reservoir configured to capture splashed lubricant from the first clutch member and the transfer component, an oil feed reservoir for collecting lubricant captured in the oil catcher reservoir, an oil conduit for delivering lubricant from the oil feed reservoir to an annular chamber surrounding the front output shaft, and a clutch flow control device configured to controllably meter the flow of lubricant from the annular chamber to a clutch feed device associated with the friction clutch assembly so as to regulate the amount of lubricant supplied to cool and lubricate the multi-plate clutch pack.

In accordance with this embodiment, the mode shift mechanism includes a motor-actuated ballramp unit having a first cam ring and a second cam ring arranged for rotational and axial movement relative to the first cam ring. The oil conduit is secured to the stationary first cam ring and includes a conduit flow passage providing fluid communication between an outlet of the oil feed reservoir and the annular chamber. The clutch flow control device is configured to move in response to movement of the second cam ring to facilitate regulated flow between first flow apertures in a flow restrictor ring mounted in the annular chamber and second flow apertures formed in the clutch flow control device. Movement of the second flow apertures in the clutch flow control device relative to the first flow apertures in the flow restrictor ring functions to regulate the flow of lubricant provided to the friction clutch assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8 is another sectional view taken generally along line 8-8 of FIG. 5 while

DETAILED DESCRIPTION

Figure 1:
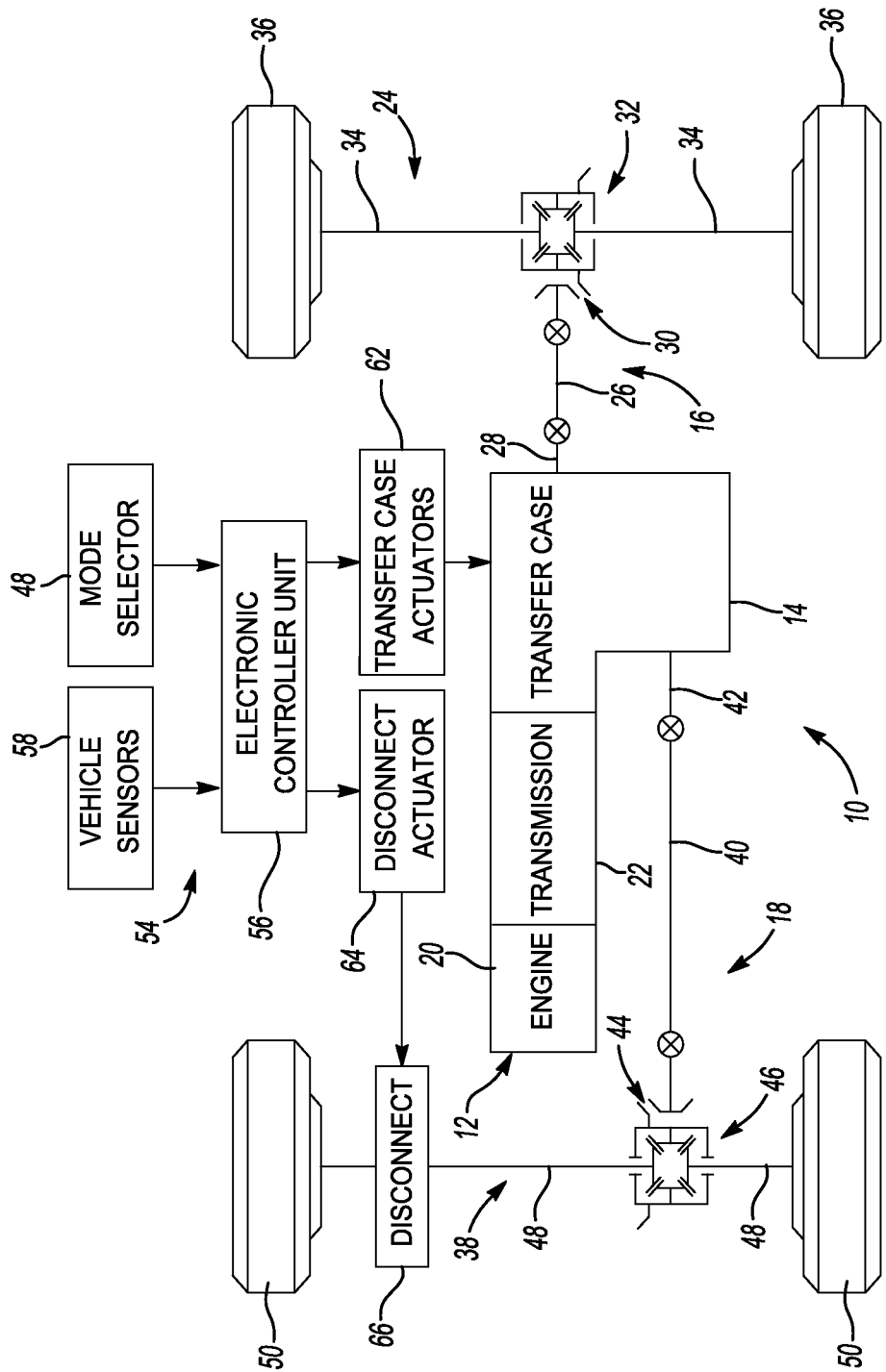
FIG. 1 is a schematic illustration of a four-wheel drive motor vehicle equipped with a power transfer system having an active transfer case constructed in accordance with the teachings of the present disclosure.

Example embodiments will now be described more fully with reference to the accompanying drawings. In particular, at least one example embodiment of a transfer case adapted for use with four-wheel drive vehicles are provided so that this disclosure will be thorough and will fully convey the true and intended scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1 of the drawings, an example drivetrain for a four-wheel drive motor vehicle 10 is shown to include a powertrain 12 operable to generate rotary power (i.e., drive torque) which is transmitted through a power transfer unit, hereinafter transfer case 14, to a primary driveline 16 and to a secondary driveline 18. Powertrain 12 is shown, in this non-limiting example, to include a power source such as an internal combustion engine 20, and a transmission 22. In the particular arrangement shown, primary driveline 16 is a rear driveline and generally includes a rear axle assembly 24 and a rear propshaft 26 arranged to drivingly interconnect a rear output shaft 28 of transfer case 14 to an input of rear axle assembly 24. The input to rear axle assembly 24 includes a hypoid gearset 30 connected to rear propshaft 26. Rear axle assembly 24 includes a rear differential assembly 32 driven by hypoid gearset 30, and a pair of rear axleshafts 34 interconnecting rear differential assembly 32 to a pair of ground-engaging rear wheels 36. Secondary driveline 18 is a front driveline and includes a front axle assembly 38 and a front propshaft 40 arranged to drivingly interconnect a front output shaft 42 of transfer case 14 to an input of front axle assembly 38. The input to front axle assembly 38 includes a hypoid gearset 44 connected to front propshaft 40. Front axle assembly 38 includes a front differential assembly 46 driven by hypoid gearset 44, and a pair of front axleshafts 48 interconnecting front differential assembly 46 to a pair of ground-engaging front wheels 50.

Motor vehicle 10 is also shown to include a traction control system 54 having an electronic controller unit 56 configured to receive input signals from vehicle sensors 58 and a mode selector 60 and to subsequently provide control signals to various actuators. In the non-limiting example shown, controller unit 56 provides control signals to one or more transfer case actuators 62 and an axle disconnect actuator 64. As will be detailed with greater specificity, transfer case actuators 62 may include a range actuator associated with a two-speed range mechanism to provide high-range and low-range drive connections, and a mode actuator associated with a mode mechanism to provide two-wheel drive and four-wheel drive modes of operation. Disconnect actuator 64 controls operation of a disconnect device 66 associated with front axle assembly 38 for selectively coupling and uncoupling front driveline 18 relative to transfer case 14. Sensors 58 are configured to provide information to controller unit 56 indicative of the current operational characteristics of vehicle 10 and/or road conditions for use in controlling operation of transfer case 14. The information provided by sensors 58 may include, without limitations, information related to vehicle speed, driveline/wheel speeds, acceleration, braking status, steering angle, throttle position, lateral displacement, and/or rain sensors. Mode selector 60 permits a vehicle operator to select operation of vehicle 10 in one of the available drive modes which may include, without limitation, a two-wheel high-range (2WH) drive mode, an automatic four-wheel high-range (AUTO-4WH) drive mode, a locked four-wheel high-range (LOCK-4WH) drive mode, and a locked four-wheel low-range (LOCK-4WL) drive mode.

Figure 2:
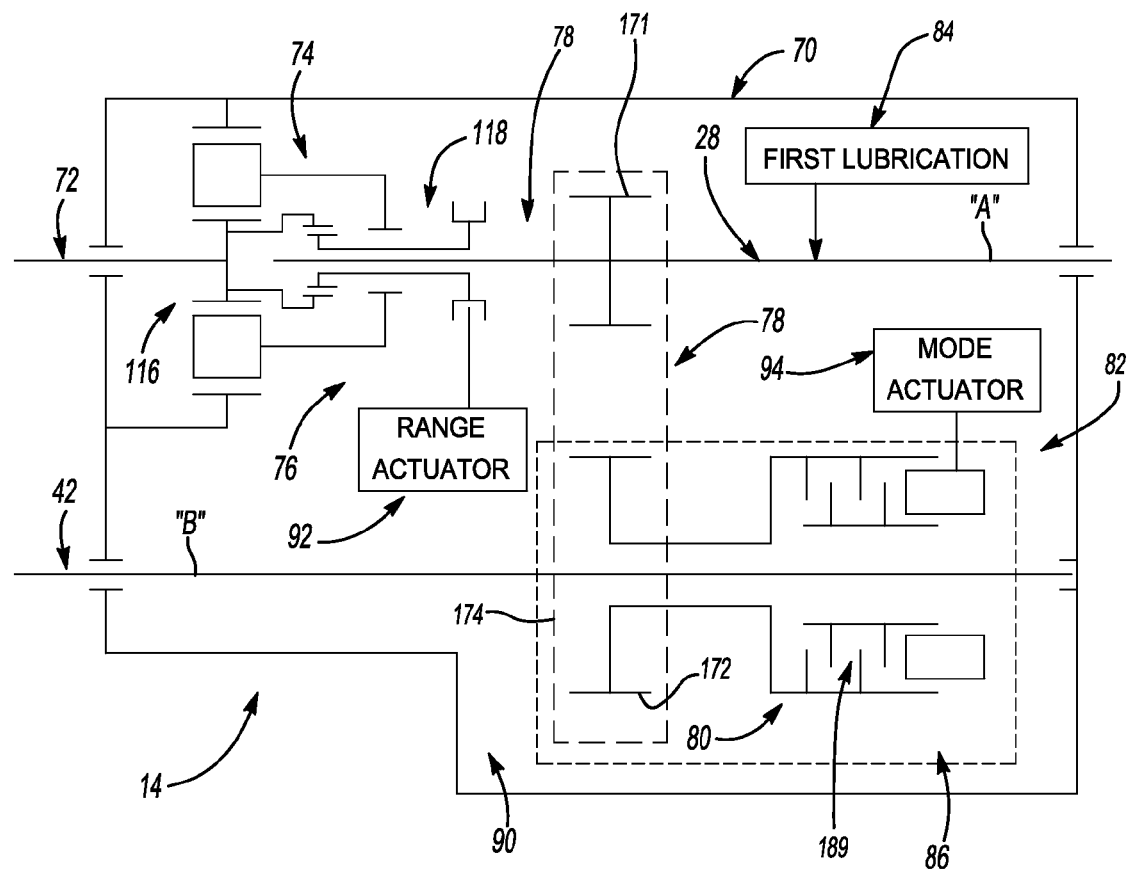
FIG. 2 is a diagrammatical illustration of a two-speed active transfer case having an adaptively-controlled multi-plate friction clutch assembly associated with its front output shaft and which embodies the teachings of the present disclosure.
Figure 3:
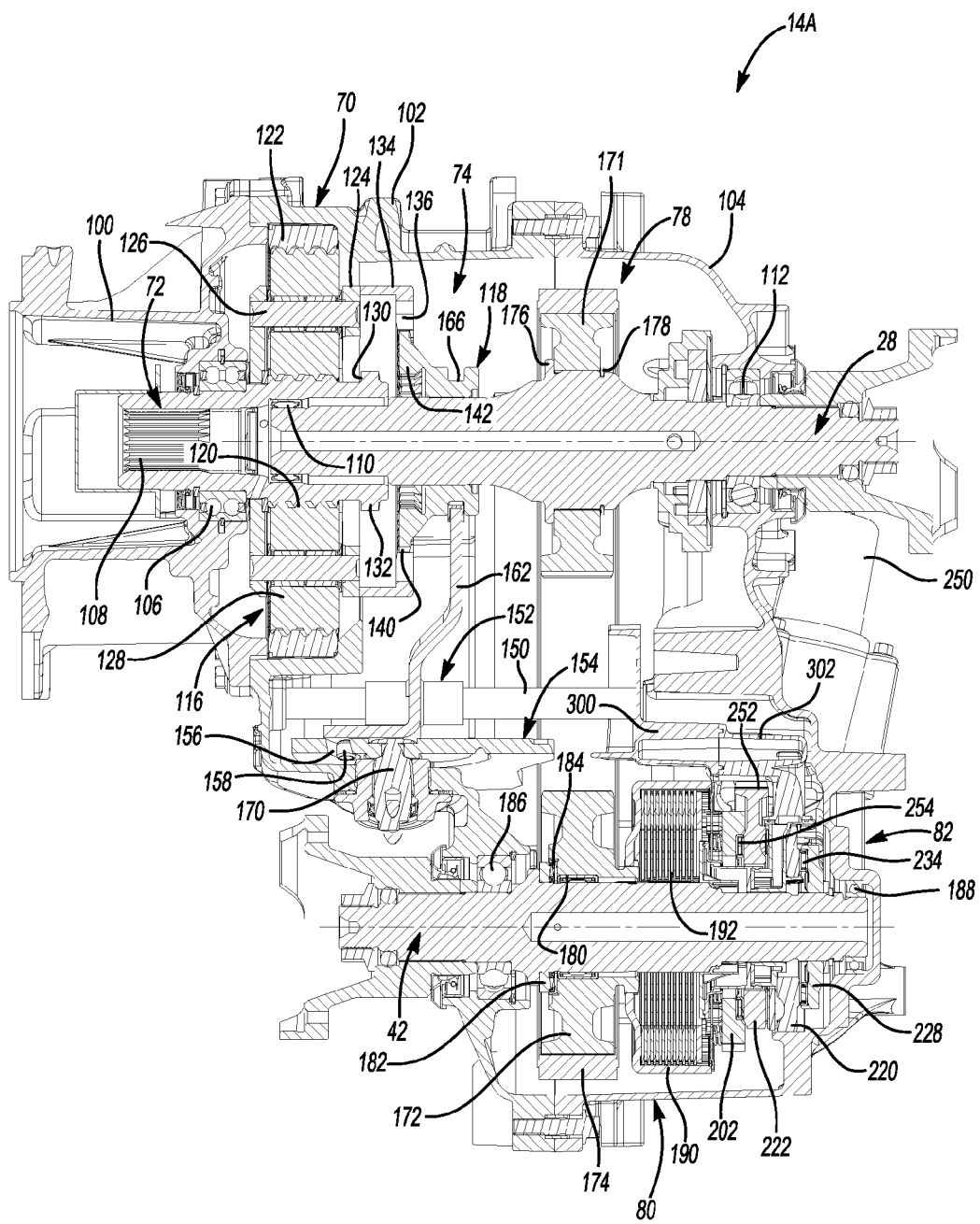
FIG. 3 is a sectional view of the two-speed active transfer case constructed in accordance with one embodiment of the present disclosure.
Figure 4:
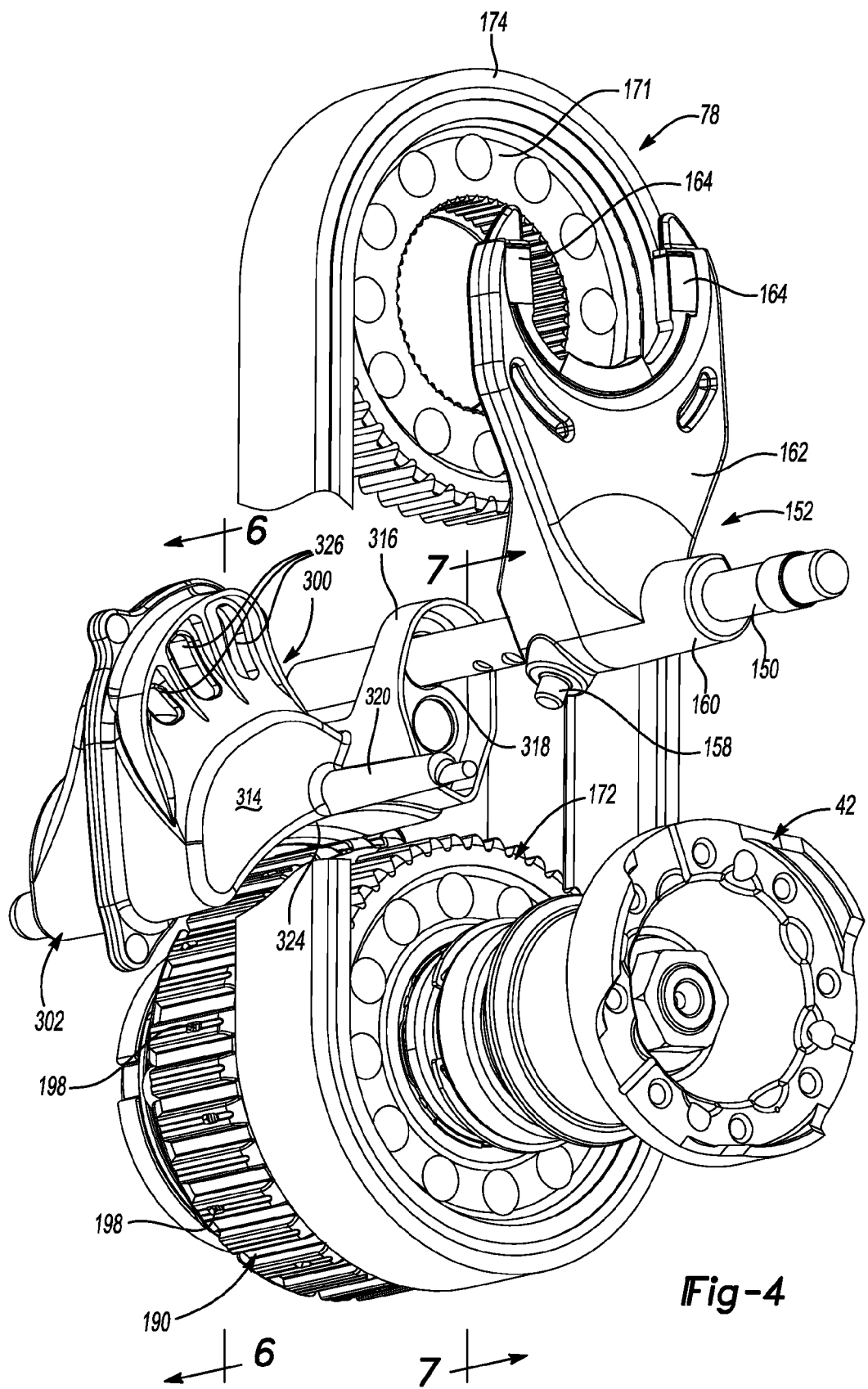
FIGS. 4 and 5 are isometric views of various components associated with the adaptively-controlled multi-plate friction clutch assembly and a splash recovery clutch lubrication system installed in the transfer case shown in FIG. 3.
Figure 5:
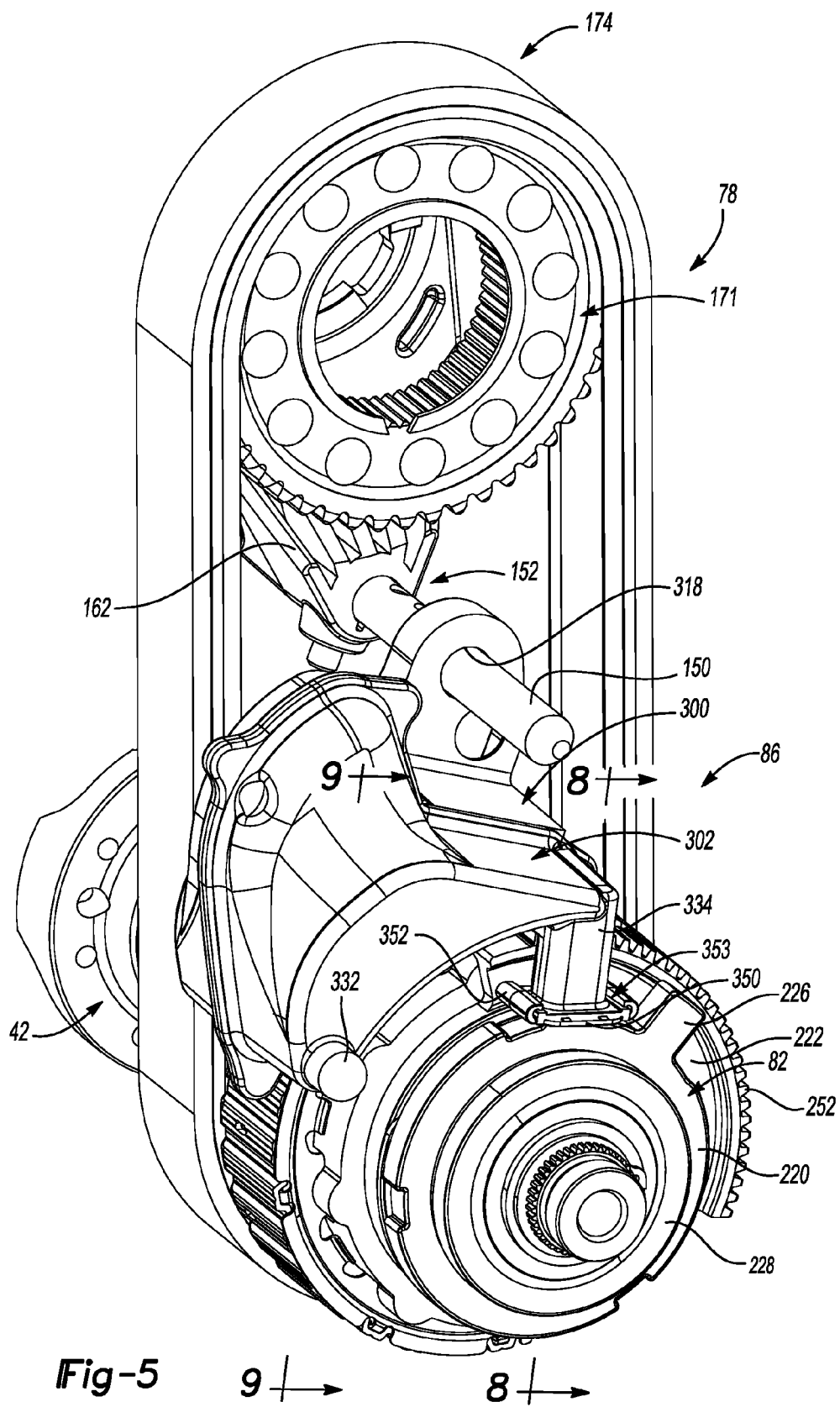
Figure 6:
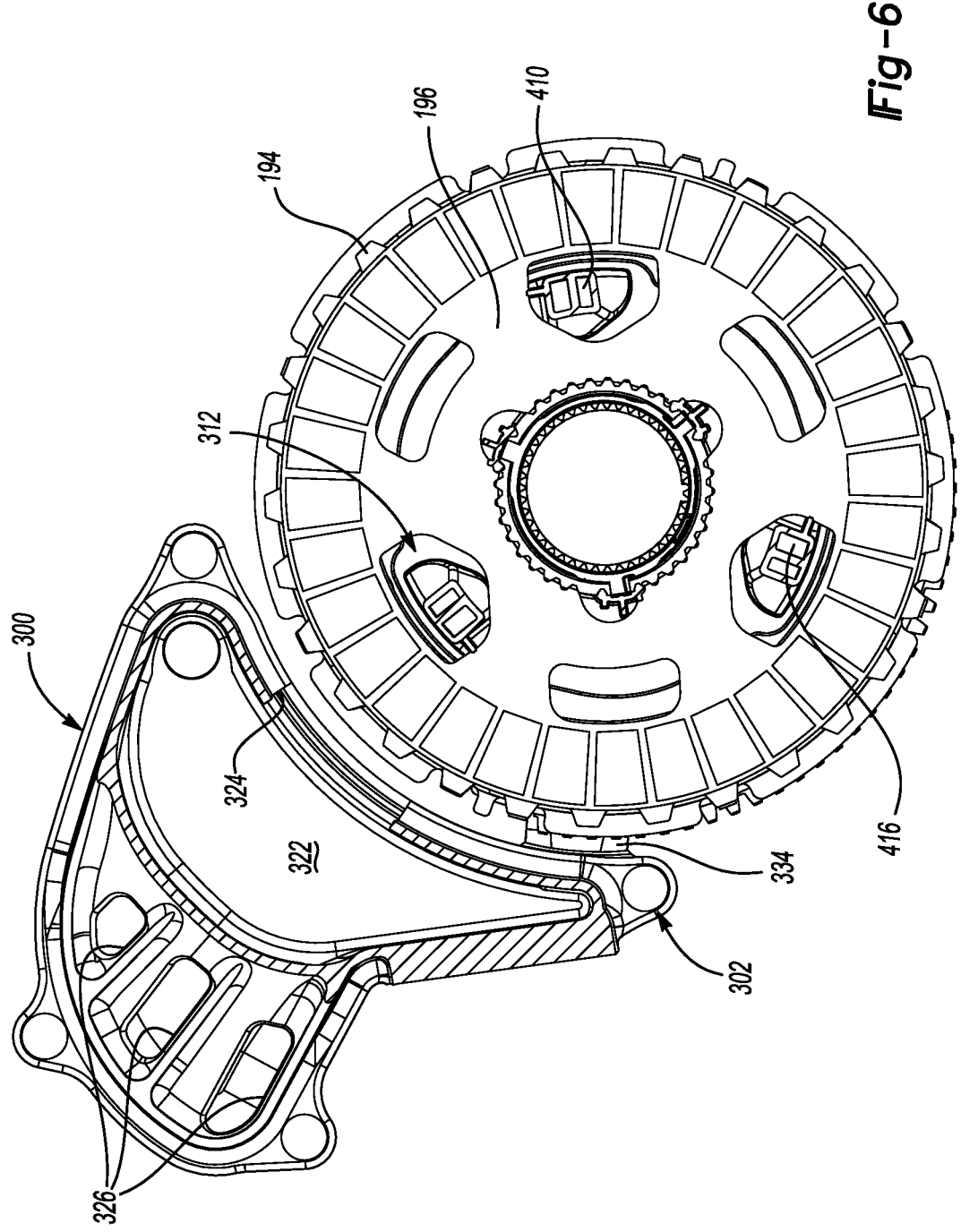
FIG. 6 is a sectional view taken generally along line 6-6 shown in FIG. 4.
Figure 7:
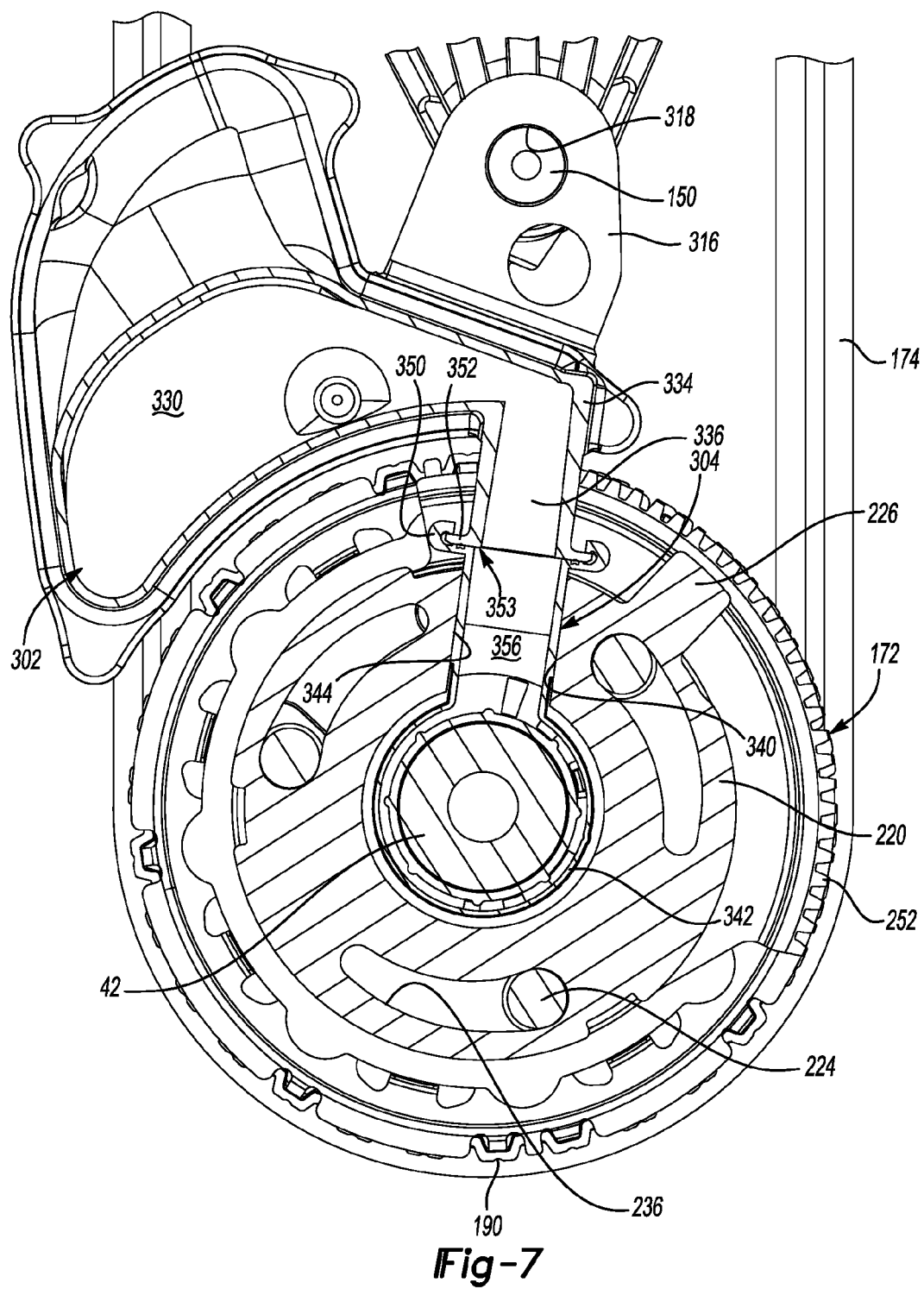
FIG. 7 is a sectional view taken generally along line 7-7 shown in FIG. 4.
Figure 8:
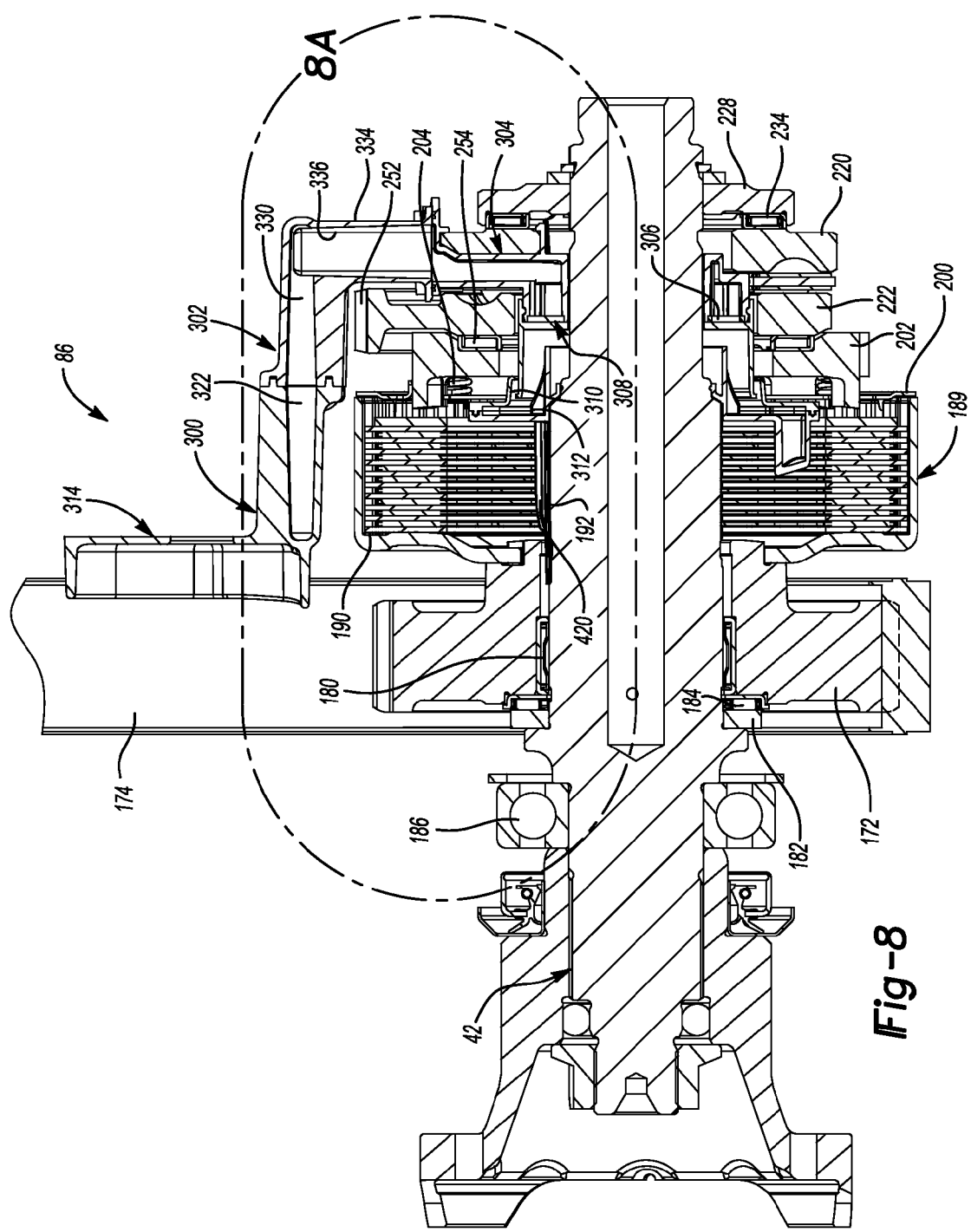
Figure 8A:
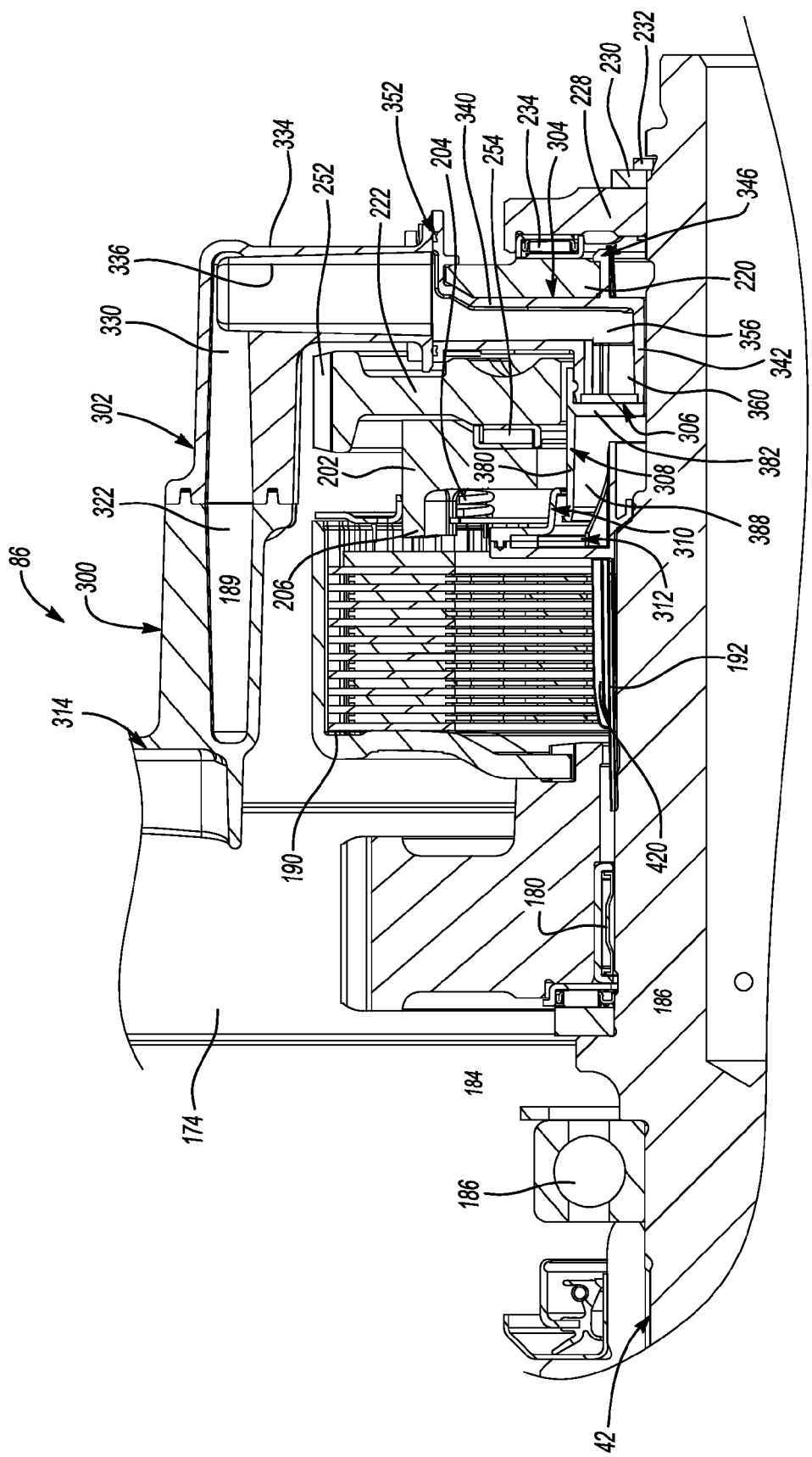
FIG. 8A is an enlarged partial view taken from FIG. 8.
Figure 9:
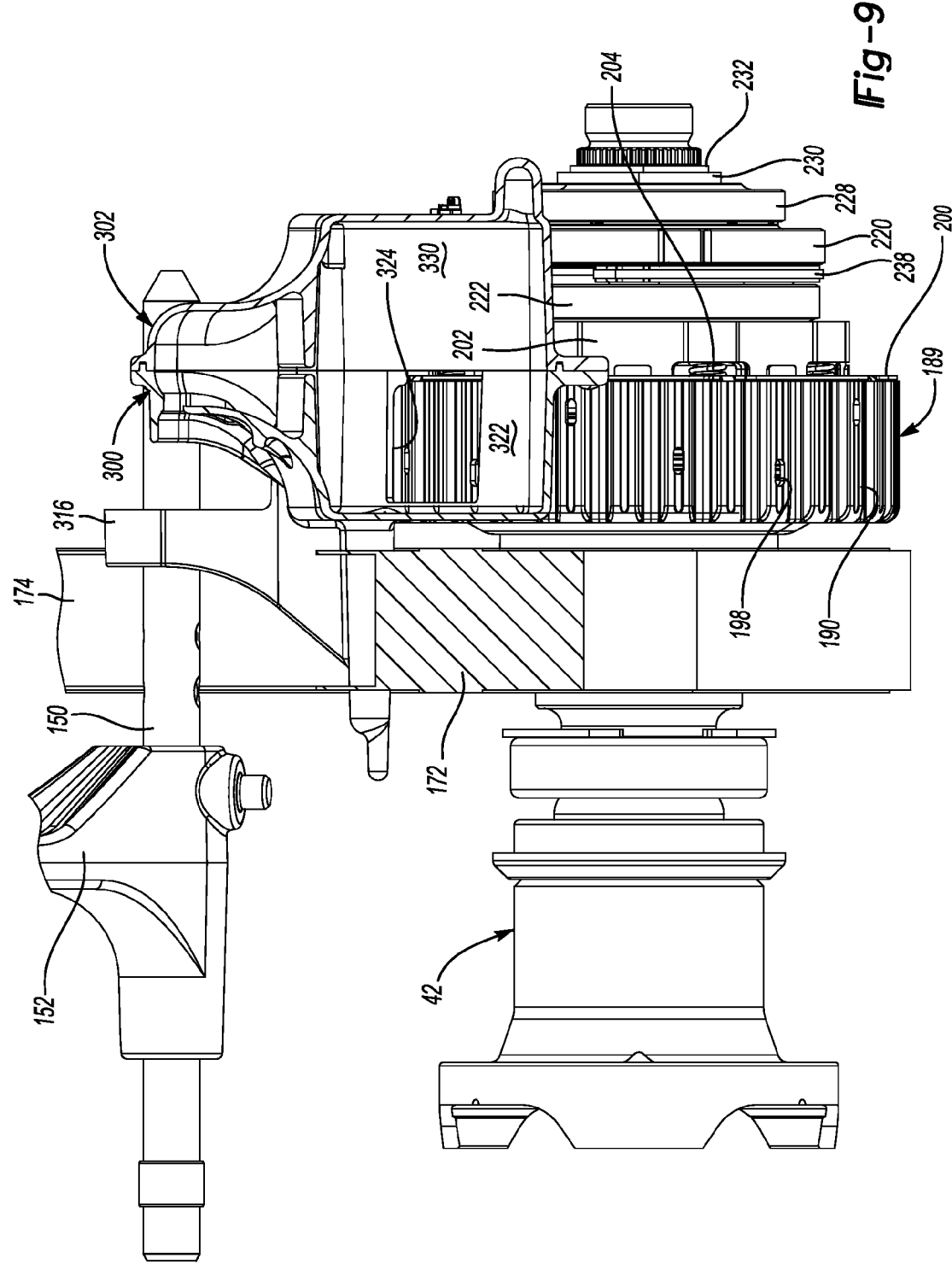
FIG. 9 is a partial sectional view taken generally along line 9-9 shown in FIG. 5.
Figure 10:
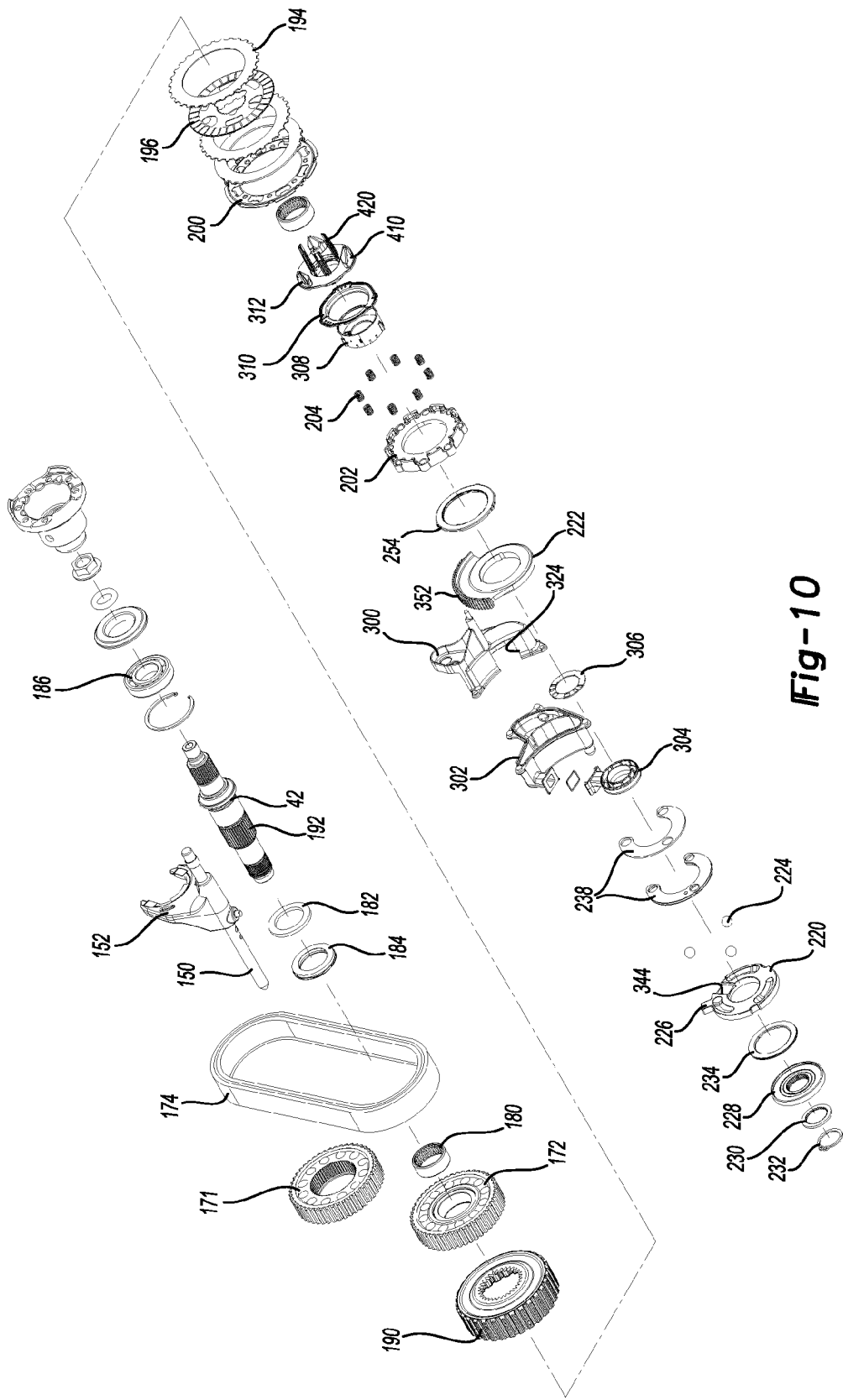
FIGS. 10 through 12 are exploded perspective views showing various components of the active mode clutch and splash recovery clutch lubricant system associated with the transfer case from FIG. 3 in greater detail.
Figure 11:
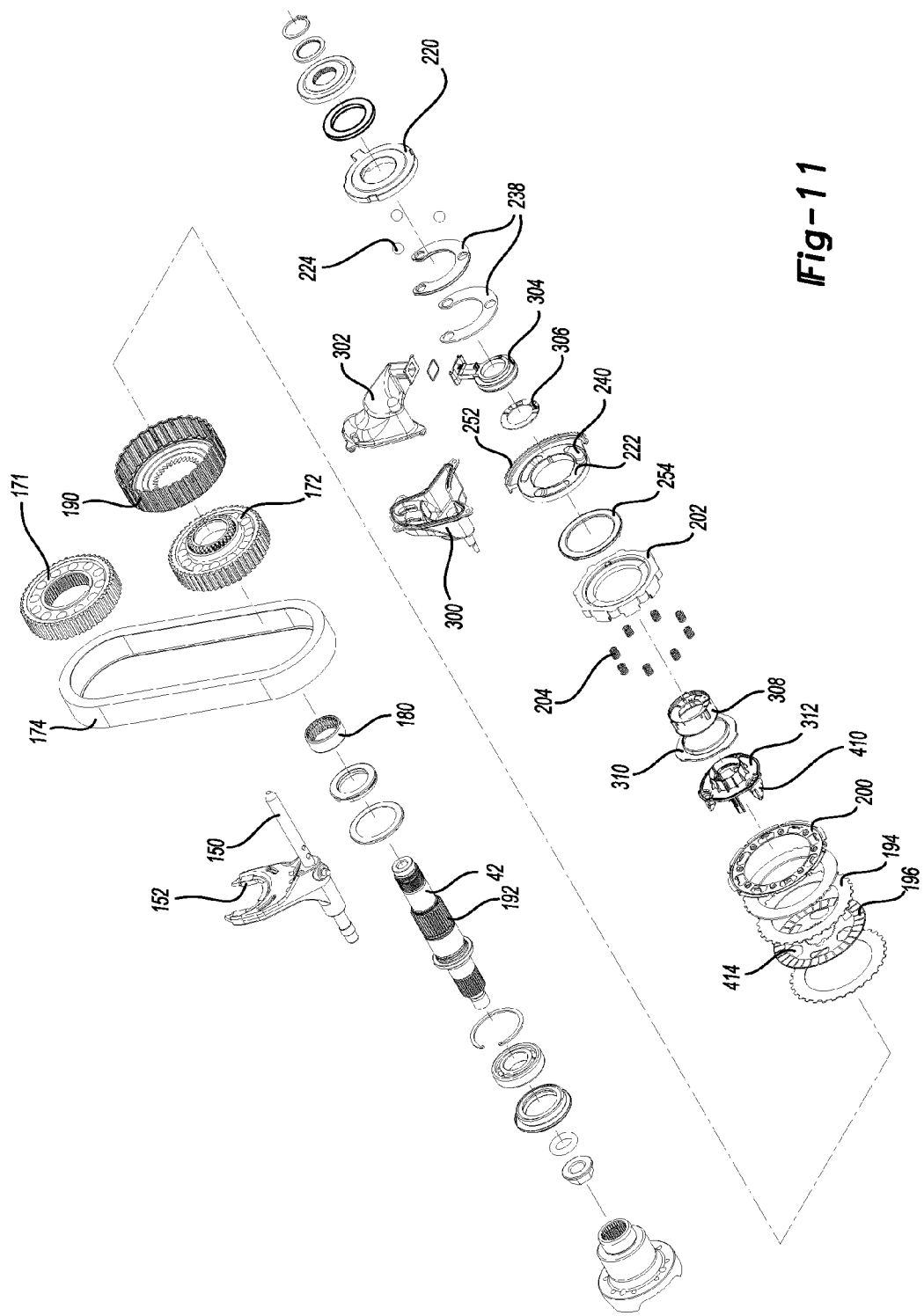
Figure 12:
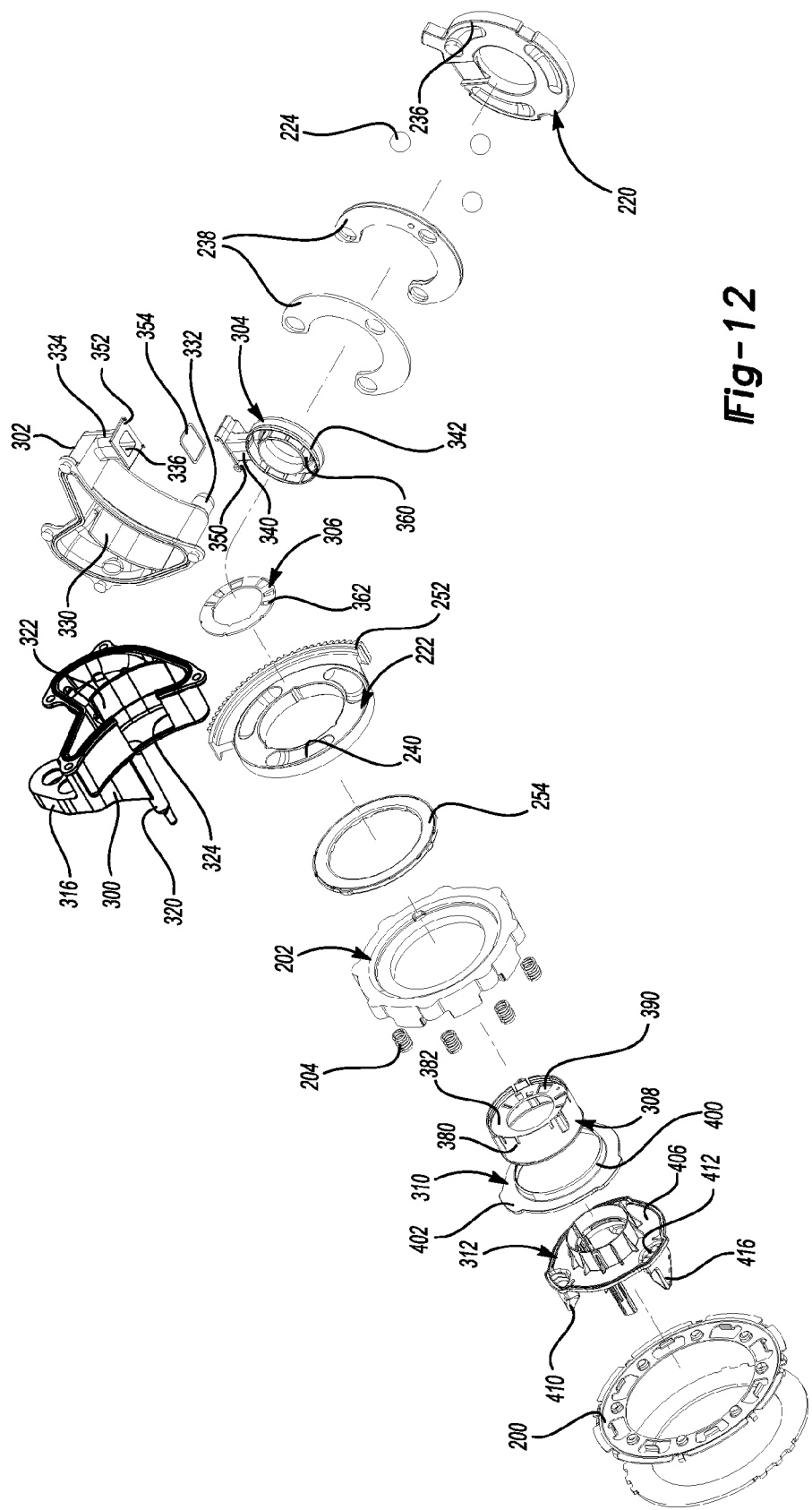
Figure 13:
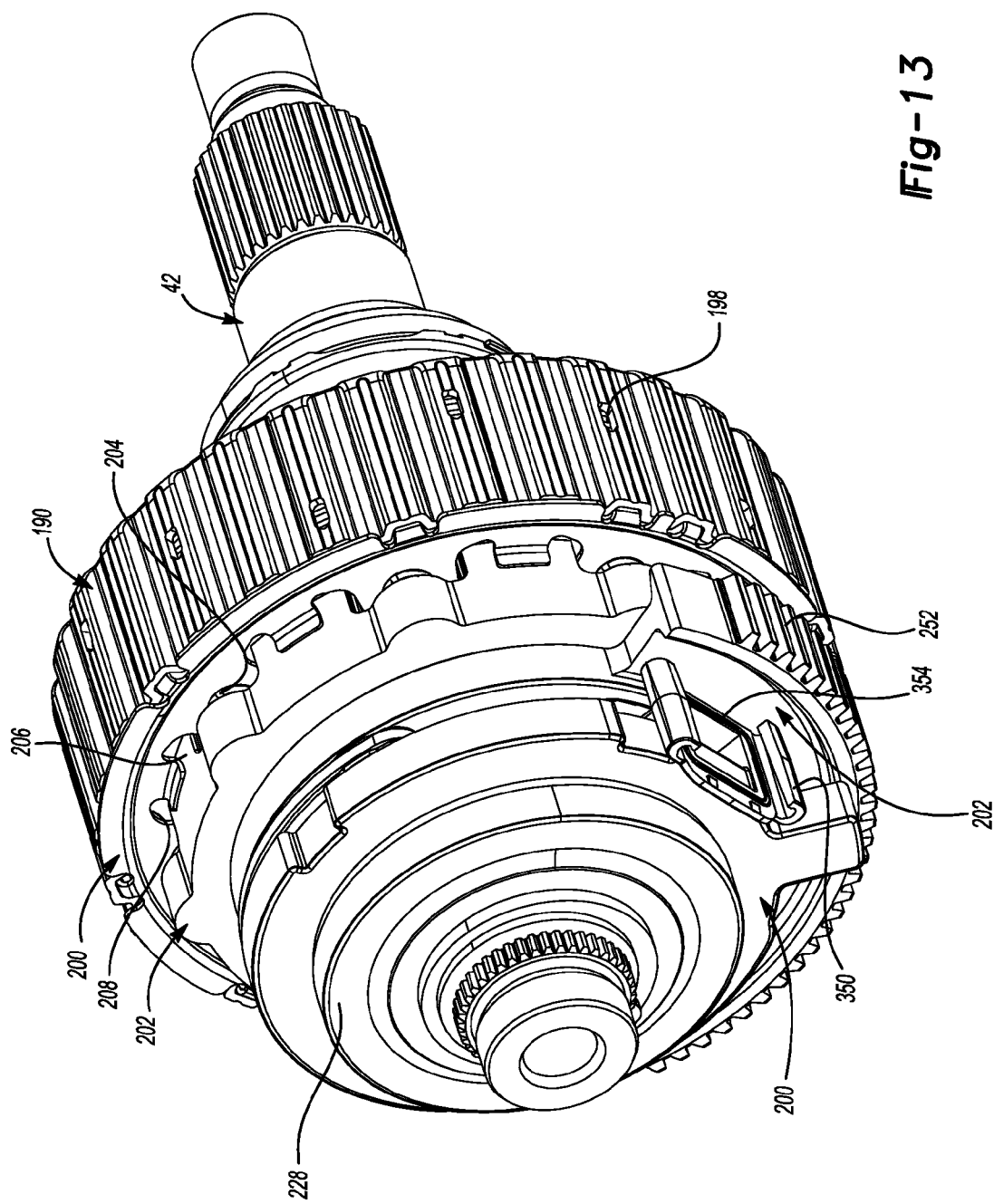
FIGS. 13 through 15 illustrate various components associated with the front output shaft of the transfer case of the present disclosure.
Figure 14:
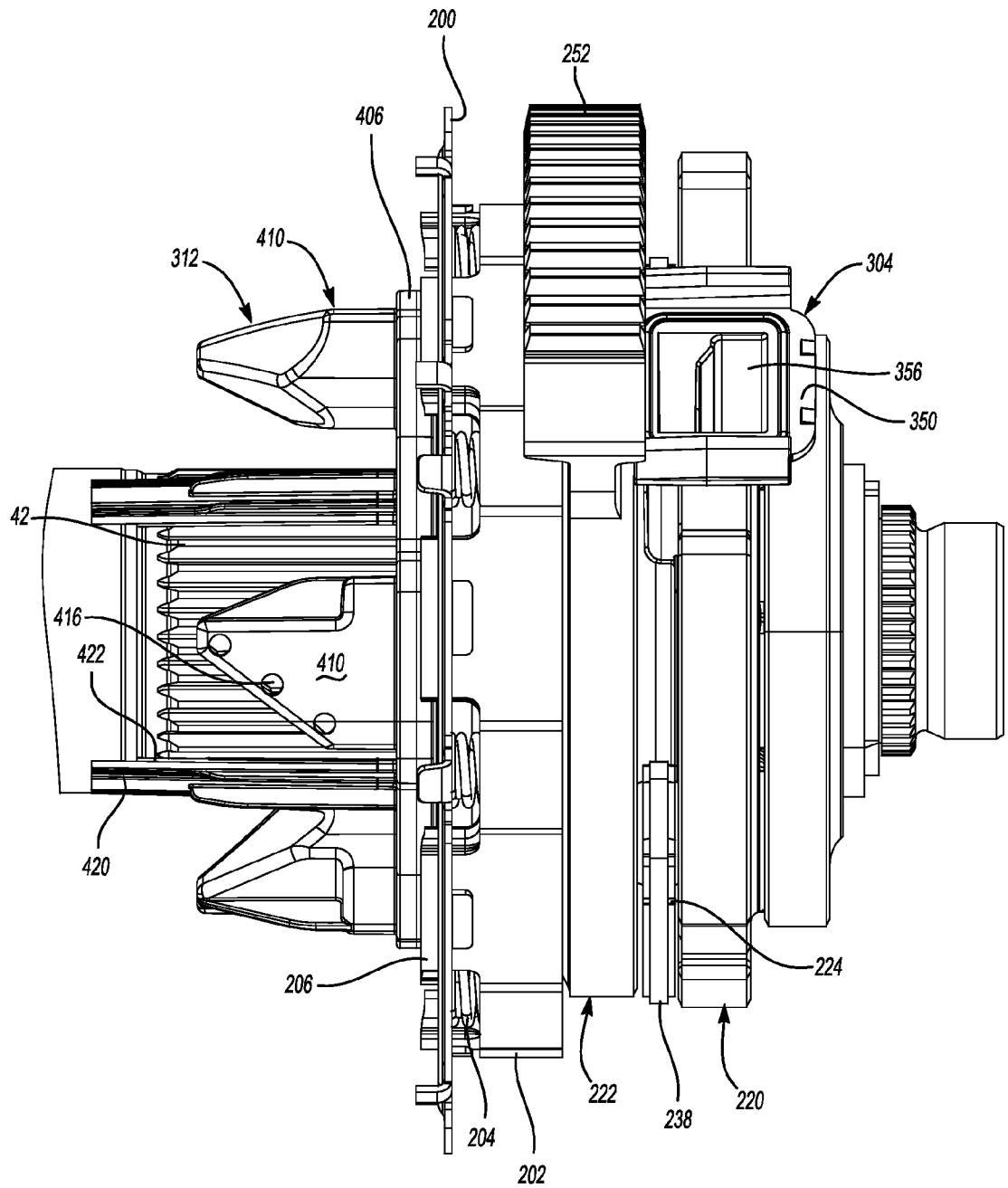
Figure 15:
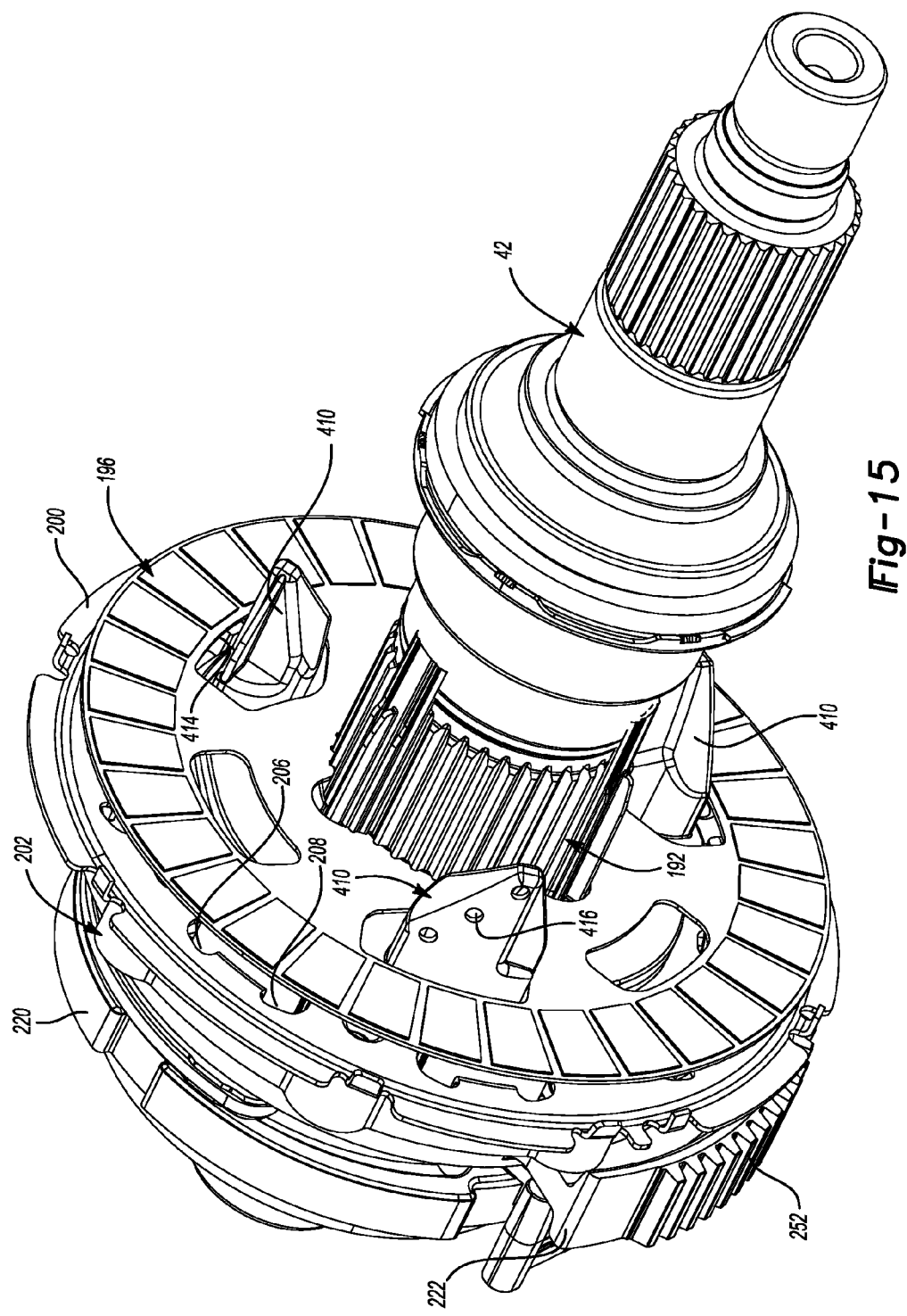
Figure 16:
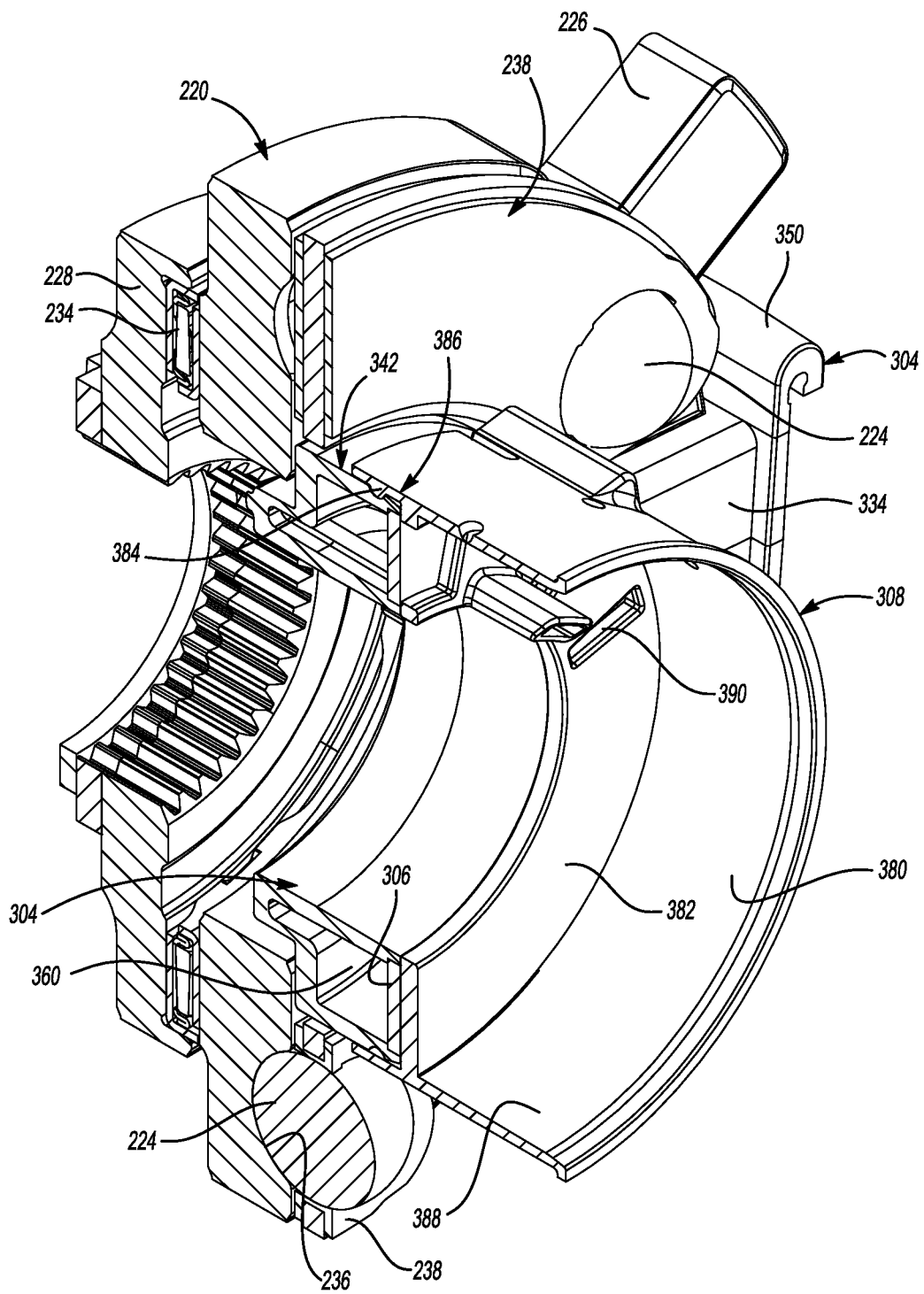
FIG. 16 is a sectioned isometric view of further components associated with the front output shaft of the transfer case constructed in accordance with the present disclosure.

Referring now to FIG. 2 of the drawings, a stick diagram of an example embodiment of transfer case 14 constructed in accordance with the teachings of the present disclosure is provided. Transfer case 14 is generally shown to include: a housing assembly 70; an input shaft 72 rotatably supported by housing assembly 70; a two-speed range mechanism 74 disposed between input shaft 72 and rear output shaft 28; a range shift mechanism 76 controlling operation of range mechanism 74; a transfer mechanism 78 driven by rear output shaft 28; a mode mechanism 80 disposed between transfer mechanism 78 and front output shaft 42; a mode shift mechanism 82 controlling operation of mode mechanism 80; a first lubrication mechanism 84 associated with rear output shaft 28; and a second lubrication mechanism 86 (shown in phantom lines) associated with front output shaft 42. As is evident, range mechanism 74 is arranged in association with a first rotary axis "A" of transfer case 14 while mode mechanism 80 is arranged in association with a second rotary axis "B" of transfer case 14. With transfer case 14 installed in vehicle 10, the first axis is generally parallel but offset above the second axis with housing assembly 70 configured to define a sump area 90 filled with a lubricating oil in an area generally configured to locate at least a portion of mode mechanism 80 within sump area 90. Transfer case 14 is also shown in FIG. 2 to include a range actuator 92 in association with range shift mechanism 76 and a mode actuator 94 in association with mode shift mechanism 80, each of which is controlled by controller unit 56. While transfer case 14 is shown to be directed to a two-speed version based on inclusion of range mechanism 74 and range shift mechanism 76, it will be understood that a one-speed version of transfer case 14 is intended to be within the scope of this disclosure.

With particular reference now to FIGS. 3 through 16, a preferred embodiment of transfer case 14 originally shown in FIGS. 1 and 2, is identified by reference numeral 14A. Housing assembly 70 is shown, in this non-limiting example, to include a multi-piece configuration having an adapter housing section 100, a front housing section 102, and a rear housing section 104. Adapter housing section 100 is configured to be rigidly secured to transmission 22 and includes a bearing assembly 106 rotatably supporting input shaft 72. Input shaft 72 includes internal splines 108 adapted to matingly engage with external splines of a transmission output shaft. Rear output shaft 28 is supported for rotation relative to input shaft 72 by a first bearing assembly 110 disposed between input shaft 72 and rear output shaft 28, and a second bearing assembly 112 disposed between rear housing section 104 and rear output shaft 28.

Range mechanism 74 is shown, in this non-limiting embodiment, to include a planetary gearset 116 and a range clutch 118. Planetary gearset 116 includes a sun gear 120 formed integrally on input shaft 72, a ring gear 122 non-rotatably fixed to front housing section 102, a carrier unit 124 having a plurality of pins 126, and a plurality of planet gears 128 each rotatably mounted on a corresponding one of pins 126 and in constant meshed engagement with sun gear 120 and ring gear 122. Input shaft 72 includes a clutch ring segment 130 having external clutch teeth 137 formed thereon. Carrier unit 124 includes a clutch ring segment 134 having internal clutch teeth 136 formed thereon. Range clutch 118 is a sliding range collar splined for common rotation with rear output shaft 28. Range collar 118 also includes external clutch teeth 140 and internal clutch teeth 142. Range clutch 118 is axially moveable on rear output shaft 28 between three (3) distinct range positions.

Range collar 118 is moveable between a high-range (H) position, a neutral (N) position, and a long-range (L) position. When range collar 118 is located in its H range position, its internal clutch teeth 142 engage external clutch teeth 132 on input shaft 72 so as to establish a first or "direct" (i.e., high-range) speed ratio drive connection between input shaft 72 and rear output shaft 28. In contrast, when range collar 118 is located in its L range position, its external clutch teeth 140 engage internal clutch teeth 136 on carrier unit 124 so as to establish a second or "reduced" (i.e., low-range) speed ratio drive connection between input shaft 72 and rear output shaft 28. Location of range collar 118 in its N position disengages rear output shaft 28 from driven connection with input shaft 72 and carrier unit 124 so as to permit relative rotation therebetween. Accordingly, the high-range connection is established when range collar 118 is located in its H range position and the low-range connection is established when range collar 118 is located in its L range position. The two-speed range mechanism shown and described is intended to exemplify any suitable gear reduction device capable of establishing two distinct speed ratio drive connections between input shaft 72 and rear output shaft 42.

Range shift mechanism 76 is shown, in the non-limiting embodiment, to include a shift rail 150 mounted between front and rear housing sections 102, 104 of housing assembly 70, a range fork unit 152 slideably disposed on shift rail 150, and a rotary sector plate 154 having a contoured range slot 156 within which a range pin 158 extends. Range pin 158 extends outwardly from a tubular hub segment 160 of range fork unit 152 such that rotation of sector plate 154 causes linear movement of range fork unit 152 based on range pin 158 moving within range slot 156. Range fork unit 152 further includes a fork segment 162 extending outwardly from hub segment 160 and having a pair of bifurcated forks 164 that are retained in an annular groove 166 formed in range collar 118. Therefore, axial movement of range fork unit 152 results in sliding movement of range collar 118 between its three distinct range positions. While not specifically shown, range actuator 92 may include an electric motor for rotatably driving a sector shaft 170 that is, in turn, coupled to sector plate 154 for rotating sector plate 154 so as to locate range collar 118 in the desired range position. Those skilled in the art will appreciate that any suitable arrangement capable of axially moving range fork unit 152 to facilitate movement of range collar 118 between its three (3) distinct range positions is within the meaning of range actuator 92.

Transfer mechanism 78 is shown in the non-limiting example, to include a first transfer component driven by rear output shaft 28 and which is arranged to transfer drive torque to a second transfer component rotatably supported on front output shaft 42. Transfer mechanism 78 is a chain and sprocket type of drive assembly including a first sprocket 171 acting as the first transfer component, a second sprocket 172 acting as the second transfer component, and an endless power chain 174 encircling first sprocket 171 and second sprocket 172. First sprocket 171 is splined for common rotation with rear output shaft 28 and is axially retained between a radial flange 176 and a snap-ring 178. Second sprocket 172 is rotatably mounted on front output shaft 42 via a needle bearing assembly 180. A retainer ring 182 and a radial thrust bearing assembly 184 are also disposed between second sprocket 172 and front output shaft 42. Front output shaft 42 is rotatably supported by housing assembly 70 via a pair of laterally-spaced roller bearing units 186 and 188. It is contemplated that alternative transfer mechanisms, such as gear drive arrangements, can be used with transfer case 14A to transfer drive torque from rear output shaft 28 to a transfer component rotatably supported on front output shaft 42.

Mode mechanism 80 is shown, in this non-limiting example, to include a wet-type friction clutch assembly 189 disposed between second sprocket 172 and front output shaft 42 for facilitating adaptive torque transfer therebetween. Friction clutch assembly 189 generally includes a first clutch member or clutch drum 190 fixed for common rotation with second sprocket 172, a second clutch member or clutch hub 192 formed integrally with an intermediate section of front output shaft 42, and a multi-plate clutch pack comprised of alternatively interleaved outer clutch plates 194 and inner clutch plates 196. Outer clutch plates 194 are splined for rotation with clutch drum 190 while inner clutch plates 196 are splined for rotation with clutch hub 192. Clutch drum 190 is a formed component and includes a plurality of oil transfer holes 198 configured to permit lubricant to flow therethrough. Friction clutch assembly 189 also includes a spring retainer ring 200 fixed (via splines, lugs, etc.) for common rotation with clutch drum 190, an axially-moveable apply plate 202 that is connected for common rotation with spring retainer ring 200, and a plurality of circumferentially aligned return springs 204 disposed between spring retainer ring 200 and apply plate 202. As will be detailed, return springs 204 are configured and arranged to normally bias apply plate 202 in a direction toward a retracted position relative to the clutch pack. Apply plate 202 includes a plurality of axially-extending and circumferentially-aligned drive lugs 206 which extend through window apertures 208 formed in spring retainer ring 200. Drive lugs 206 are configured to engage and apply a clutch engagement force on the clutch pack, the magnitude of which controls the amount of drive torque that is transferred from clutch drum 190 to clutch hub 192 through the clutch pack. While mode mechanism 80 is shown preferably configured as a multi-plate wet-type friction clutch assembly, those skilled in the art will recognize that such a mode mechanism is intended to represent any type of mode clutch or coupling capable of selectively coupling front output shaft 42 for rotation with second sprocket 172 of transfer mechanism 78 for facilitating the transfer of drive torque to front driveline 18.

Mode shift mechanism 82 is shown, in this non-limiting example, to include a motor-driven rotary-to-linear conversion device of the type commonly referred to as a ballramp unit. The ballramp unit generally includes a first cam ring 220, a second cam ring 222, and followers 224 disposed in aligned cam tracks formed therebetween. First cam ring 220 is non-rotatably fixed to housing assembly 70 via an anti-rotation tab 226. First cam ring 220 is also fixed axially against a backing plate 228 via a shim ring 230 and a snap ring 232. Backing plate 228 is splined for rotation with front output shaft 42 such that a radial thrust bearing unit 234 is disposed between first cam ring 220 and backing plate 228. First cam ring 220 has a plurality of circumferentially-aligned first cam tracks 236 which followers 224 engage. Second cam ring 222 includes a matching plurality of second cam tracks 240 against which followers 224 also rollingly engage. A pair of cage plates 238 retain and align followers 224 relative to first cam tracks 236 and second cam tracks 240. Second cam ring 222 is adapted to move axially relative to first cam ring 220 as a result of rotation of second cam ring 222 relative to first cam ring 220. As such, the profile and/or contour of cam tracks 236 and 240 controls the linear motion of second cam ring 222. An electric motor 250 acts as mode actuator 94 and has a rotary output driving a worm (not shown) that is meshed with geared rack segment 252 of second cam ring 222. As will be understood, the direction and amount of rotation of the electric motor's output controls the direction and amount of rotation of second cam ring 222 which, in turn, controls the direction and amount of axial travel of second cam ring 222 relative to the clutch pack. A thrust bearing assembly 254 is disposed between a face surface of second cam ring 222 and a face surface of apply plate 202 to accommodate rotation of apply plate 202 relative to second cam ring 222 during coordinated axial movement of apply plate 202 with second cam ring 222.

Second cam ring 202 is configured to control axial movement of apply plate 202 between a first or minimum clutch engagement position and a second or maximum clutch engagement position relative to the clutch pack of friction clutch assembly 189. With apply plate 202 axially located in its first position, a predetermined minimum clutch engagement force is exerted by drive lugs 206 on the clutch pack, thereby transferring a minimum amount of drive torque from rear output shaft 28 (through transfer mechanism 78) to front output shaft 42. Typically, no drive torque is transmitted from rear output shaft 28 and transfer mechanism 74 through friction clutch assembly 189 when apply plate 202 is located in its first position, thereby establishing a "released" mode for friction clutch assembly 189 and a two-wheel drive mode (2WD) for transfer case 14A. In contrast, with apply plate 202 axially located in its second position, a predetermined maximum clutch engagement force is exerted by drive lugs 206 on the clutch pack, thereby transferring a maximum amount of drive torque through friction clutch assembly 189 to front output shaft 42. In this position, a "fully engaged" mode is established for friction clutch assembly 189 and a locked four-wheel drive mode (LOCK-4WD) is established for transfer case 14A. Precise control over the axial location of apply plate 202 between its first and second positions permits adaptive torque transfer from rear output shaft 28 to front output shaft 42 so as to establish an on-demand four-wheel drive (AUTO-4WD) mode for transfer case 14A. Return springs 204 react between spring retainer ring 200 and apply plate 202 so as to normally bias apply plate 202 toward its first position. Those skilled in the art will recognize that mode shift mechanism 82 can be any suitable power-operated arrangement operable for controlling movement of apply plate 202 relative to the clutch pack.

First lubrication mechanism 84 is shown, in this non-limiting example, to include a lube pump 270 having a pump housing 272 non-rotatably fixed to housing assembly 70, and a pump assembly 274 disposed in a pump chamber formed within housing 272. Pump assembly 274 has a rotary pump member fixed for rotation with rear output shaft 28 and which is operable for drawing lubricant from sump area 90 (through a supply tube 276) into a suction-side inlet portion of the pump chamber formed in pump housing 272. Rotation of the rotary pump member caused by rotation of rear output shaft 28 causes the lubricant to be pressurized and discharged from a pressure-side discharge portion of the pump chamber for delivery to a central lube channel 278 formed in rear output shaft 28 via one or more radial feed ports 280. Thereafter, the lubricant in control lube channel 278 is radially dispersed via radial discharge ports to provide lubricant to the various rotary components aligned with the "A" axis. In one embodiment, lube pump 270 could be a gerotor pump.

Second lubrication mechanism 86 is shown, in this non-limiting embodiment, to be configured to catch lubricant splashed from clutch drum 190, second sprocket 172 and chain 174 and to transfer the captured lubricant for use in lubricating and cooling components associated with mode mechanism 80 and other rotary components aligned with the "B" axis. In general, second lubrication mechanism 86 is a "splash recovery" lubrication system that is operable for use in power transfer units having a multi-plate friction clutch assembly disposed, at least partially, for rotation in a lubricant sump, such as sump area 90. Lubrication mechanism 86 generally includes an oil catcher reservoir 300, an oil feed reservoir 302, an oil conduit 304, a flow restrictor ring 306, a clutch flow control device 308, a clutch feed cover 310, and a clutch feed device 312. These components are configured and arranged to capture splashed lubricant and provide a flow pathway for transmitting the lubricant to the clutch pack.

Oil catcher reservoir 300 is preferably a molded plastic component defining an oil catching section 314 and an attachment section 316. Attachment section 316 includes an aperture 318 through which shift rail 150 extends and an axially-extending retention lug 320 adapted to be secured in a complementary-shaped aperture in housing assembly 70. Oil catching section 314 defines a contoured internal oil catcher cavity 322 to which lubricant is supplied via one or more clutch drum inlet port 324 overlying clutch drum 190 and via a plurality of chain inlet ports 326 located in close proximity to chain 174. Clutch drum inlet port 324 is located to be in close proximity to an upper portion of clutch drum 190 and above the fill level of oil sump 90. Likewise, chain inlet ports 326 are located to be in close proximity to chain 174. A plurality of three peanut-shaped chain inlet ports 326 are illustrated and disposed below a splash deflector flange 328 formed on oil catcher reservoir 300.

Oil catcher reservoir 300 is configured to be sealingly mounted along mating peripheral surfaces to oil feed reservoir 302 such that oil catcher cavity 322 is in fluid communication (via one or more flow passages) with an internal oil feed cavity 330 defined within oil feed reservoir 302. Preferably, cavities 322 and 330 are configured to gravity feed lubricant into oil feed cavity 330. As seen, another axially-extending retention lug 332 extends from oil feed reservoir 302 and is configured to be retained in a similarly shaped retention aperture also formed in housing assembly 70. Oil feed reservoir 302 is also preferably a molded plastic component and is formed to include a tubular oil feed conduit section 334 having a feed passage 336 configured to communicate with oil feed cavity 330.

Oil conduit 304 includes, in this non-limiting example, a radially-extending web segment 340 and an axially-extending tubular segment 342. Web segment 340 is configured to be installed in a recessed portion 344 of first cam ring 220 and is non-rotatably mounted thereto via a snap-fit connection 346. Web segment 340 terminates in a peripheral mounting flange 350 that is configured to accept and retain a mating mounting flange 352 formed on oil feed conduit section 334 via a snap-fit or slip-fit connection 353. A seal or gasket 354 provides a fluid-tight connection between mounting flanges 350 and 352. Web segment 340 includes a flow channel 356 configured to be in direct fluid communication with feed passage 336 of oil feed reservoir 302. Tubular segment 342 of oil conduit 304 surrounds front output shaft 42 and defines a toroidal chamber 360 that is in fluid communication with flow channel 356. Flow restrictor ring 306 is disposed within toroidal chamber 360 and includes a plurality of flow apertures 362 formed therein.

Clutch flow control device 308 is shown, in this non-limiting example, to include a tubular shroud segment 380 and a radial flange segment 382. Shroud segment 380 includes a circumferential lip portion 384 adapted to establish a snap-in connection 386 with tubular segment 342 of oil conduit 304 such that flange segment 382 is aligned adjacent to flow restrictor ring 306 so as to generally enclose toroidal chamber 360. Clutch flow control device 308 is adapted to move (i.e., rotate) with second cam ring 222 to regulate or meter the flow of lubricant from toroidal chamber 360 of oil conduit 304 into a flow control chamber 388 defined between shroud segment 380 and front output shaft 42. In particular, valve windows 390 are formed in flange segment 382 and can be moved into and out of alignment with flow apertures 362 associated with flow restrictor ring 306 under certain circumstances.

In accordance with one non-limiting arrangement, valve windows 390 are not aligned with flow apertures 362 when second cam ring 222 is located in its first position. Thus, when friction clutch assembly 189 is fully opened, the transmission of lubricant from toroidal chamber 360 into clutch flow control chamber 388 is inhibited, thereby allowing lubricant to continuously fill oil feed cavity 330 in oil feed reservoir 302. In contrast, when second cam ring 222 is located in its second position and friction clutch assembly 189 is fully engaged, valve windows 390 are aligned with flow apertures 362 so as to permit lubricant to feed from toroidal chamber 360 into flow control chamber 388. In this manner, the supply of lubricant to the multi-plate clutch pack of friction clutch assembly 187 can be regulated. Obviously, movement of second cam ring 222 between its first and second positions can be utilized to control a variable amount of overlap and communication between valve windows 390 and flow apertures 360. Preferably, clutch flow control device 308 functions to only rotate in coordination with second cam ring 222 and does not move axially with second cam ring 222 based on a groove and tab type of connection therebetween.

Clutch feed cover 310 is configured, in this non-limiting example, to surround shroud segment 380 of clutch flow control device 308. Clutch feed cover 310 includes an axial funnel section 400 surrounding shroud segment 380 and a radial plate segment 402 connected via a snap-in connection 404 to a ring segment 406 of clutch feed device 312. The annular spaced located between radial plate segment 402 of clutch feed cover 310 and ring segment 406 of clutch feed device 312 defines a clutch feed chamber 408 that is in communication with flow control chamber 388. A plurality of circumferentially-aligned flow conduits 410 extend outwardly from radial plate segment 402 of clutch feed device 312 and each includes a flow passage 412 in fluid communication with clutch feed chamber 408. Conduits 410 are configured to extend through windows 414 formed in inner clutch plates 196 so as to extend axially into the multi-plate clutch pack. Each conduit 410 also includes a plurality of discharge ports 416 configured to permit lubricant within flow passages 412 to be centrifugally delivered into the clutch pack, thereby facilitating optimal cooling and lubrication of the friction surfaces. An end discharge port 416 communicates with flow passages 412 in conduits 410 to permit further axial distribution of the lubricant through the clutch pack. Clutch feed device 312 further includes a plurality of circumferentially-aligned drive tabs 420 extending from ring segment 406 and having internal splines 422 that are adapted to engage external splines 424 on front output shaft 42. As such, clutch feed device 312 and clutch feed cover 310 rotate with front output shaft 42.

The splash recovery clutch lubrication system associated with the present disclosure is applicable to other power transfer units of the type used in vehicular drivetrain applications to provide a "pumpless" solution to lubricating rotary components aligned for rotation along a rotary axis positioned in proximity to a lubrication sump. Those skilled in the art will appreciate that a non-metered version can be provided by elimination flow restrictor ring 306 so as to permit uninhibited flow of the lubricant from toroidal chamber 360 into flow control chamber 388. Regardless, the splash recovery clutch lubrication system of the present disclosure provides a means for supplying lubricant to a control portion of a rotating clutch located in the lubricant sump. The present disclosure also eliminates pump priming concerns at low RPM since as the rotational speed increases, the lubricant splashes and reduces the sump height. However, the recovery system feeds lubricant back into the clutch system without concerns related to conventional pump priming. Other resulting advantages include minimized spin losses, weight savings, improved packaging and noise reduction over conventional pump systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A transfer case for use in a four-wheel drive motor vehicle having a powertrain and first and second drivelines, the transfer case comprising:
   a housing defining a sump area filled with a lubricant;
   a first shaft rotatably supported by said housing and configured to transfer drive torque from the powertrain to the first driveline;

a second shaft rotatably supported by said housing in close proximity to said sump area and configured for connection to the second driveline;

a transfer mechanism having a first transfer component drivingly coupled to said first shaft and a second transfer component driven by said first transfer component, said second transfer component being rotatably mounted on said second shaft;

a multi-plate friction clutch assembly surrounding said second shaft and including a first clutch member drivingly coupled to said second transfer component, a second clutch member drivingly coupled to said second shaft, and a clutch pack of interleaved first and second clutch plates drivingly coupled to corresponding one of said first and second clutch members;

a power-operated clutch actuator operable for moving an apply member relative to said clutch pack so as to control the magnitude of a clutch engagement force exerted thereon and concurrently control the amount of drive torque transferred from said first shaft through said transfer mechanism and said friction clutch assembly to said second shaft; and a splash recovery clutch lubrication system for capturing lubricant splashed in response to rotation of at least one of said second transfer component and said first clutch member and feeding said captured lubricant to a clutch feed chamber that is in fluid communication with said clutch pack, said splash recovery clutch lubrication system including an oil catcher reservoir configured to capture splashed lubricant and retain said captured lubricant in an oil catcher cavity, an oil feed reservoir having an oil feed cavity communicating with said oil catcher cavity and an oil feed passage, an oil conduit having a web segment with a flow channel communicating with said oil feed passage and a tubular segment surrounding said second shaft and defining an annular chamber communicating with said flow channel, and a flow control device operable to controllably regulate flow of said lubricant from said annular chamber into said clutch feed chamber.

2. The transfer case of claim 1 wherein said transfer mechanism includes a first sprocket drivingly coupled to said first shaft, a second sprocket rotatably supported on said second shaft, and a power chain encircling said first and second sprockets for transferring drive torque from said first shaft to said second sprocket, wherein said first clutch member is a clutch drum fixed for rotation with said second sprocket and said second clutch member is a clutch hub fixed for rotation with said second shaft, and wherein said oil catcher reservoir includes a first inlet port configured to catch lubricant splashed upon rotation of said clutch drum and a second inlet port configured to catch lubricant splashed upon rotation of said power chain and/or said second sprocket.

3. The transfer case of claim 1 wherein said power-operated clutch actuator includes a ballramp unit having a first cam ring and a second cam ring that is axially moveable relative to said first cam ring, wherein said web segment of said oil conduit is connected to said first cam ring, and wherein said tubular segment of said oil conduit is disposed between said second shaft and said second cam ring.

4. The transfer case of claim 3 wherein movement of said second cam ring causes movement of said flow control device so as to meter the amount of lubricant flowing from said annular chamber into said clutch feed chamber.

5. The transfer case of claim 4 wherein said splash recovery lubrication system further includes a flow restrictor ring disposed within said annular chamber and having at least one flow aperture, and wherein movement of said flow control device in response to movement of said second cam ring regulates flow of lubricant through said flow aperture.

6. The transfer case of claim 5 wherein said clutch flow control device includes a shroud segment and a radial flange segment, wherein said shroud segment surrounds said tubular segment of said oil conduit, wherein said radial flange segment overlies an end portion of said tubular segment of said oil conduit and encloses said annular chamber, and wherein radial movement of said clutch flow control device causes window apertures formed in said radial flange segment to align with said flow aperture so as to permit lubricant to flow from said annular chamber into said clutch feed chamber.

7. The transfer case of claim 6 wherein said splash recovery clutch lubrication system further includes a clutch feed cover having a funnel section surrounding said shroud segment of said clutch flow control device and a radial plate segment, and a clutch feed device drivingly coupled for rotation with said second shaft, wherein said clutch feed device includes a ring segment fixed to said plate segment of said clutch flow control device so as to define said clutch feed chamber therebetween.

8. The transfer case of claim 7 wherein said clutch feed device further includes a plurality of tubular conduits extending axially from said ring segment and retained in apertures formed in said second clutch plates, said conduits each having radial discharge ports for transmitting lubricant from said clutch feed chamber radially outwardly into said clutch pack.

9. The transfer case of claim 8 wherein said clutch feed device further includes drive lugs extending from said ring segment and which are coupled for common rotation with said second shaft.

10. The transfer case of claim 1 further comprising a two-speed range mechanism disposed between an input shaft driven by the powertrain and said first shaft and which is operable to establish first and second speed ratio driving connections therebetween.

11. The transfer case of claim 1 wherein said oil catcher reservoir and said oil feed reservoir are interconnected and fixed to said housing, and wherein lubricant in said oil catcher cavity is gravity fed to said oil feed cavity.

12. The transfer case of claim 1 wherein said oil catcher reservoir is disposed above said friction clutch assembly, wherein said oil feed reservoir is disposed above said clutch actuator, and wherein said clutch assembly is at least partially disposed for rotation within said sump of lubricant.

13. A transfer case for use in a four-wheel drive motor vehicle having a powertrain and first and second drivelines, the transfer case comprising:

a housing defining a sump area filled with a lubricant;

a first shaft rotatably supported by said housing and configured to transfer drive torque from the powertrain to the first driveline;

a second shaft rotatably supported by said housing in close proximity to said sump area and configured for connection to the second driveline;

a transfer mechanism having a first transfer component drivingly coupled to said first shaft and a second transfer component driven by said first transfer component, said second transfer component being rotatably mounted on said second shaft;

a multi-plate friction clutch assembly surrounding said second shaft and including a first clutch member drivingly coupled to said second transfer component, a second clutch member drivingly coupled to said second shaft, and a clutch pack of interleaved first and second clutch plates drivingly coupled to corresponding one of said first and second clutch members;

a power-operated clutch actuator operable for moving an apply member relative to said clutch pack so as to control the magnitude of a clutch engagement force exerted thereon and concurrently control the amount of drive torque transferred from said first shaft through said transfer mechanism and said friction clutch assembly to said second shaft; and a splash recovery clutch lubrication system for capturing lubricant splashed in response to rotation of at least one of said second transfer component and said first clutch member and feeding said captured lubricant to a clutch feed chamber that is in fluid communication with said clutch pack, said splash recovery clutch lubrication system including an oil catcher reservoir configured to capture splashed lubricant and retain said captured lubricant in an oil catcher cavity, an oil feed reservoir having an oil feed cavity communicating with said oil catcher cavity and an oil feed passage, and an oil conduit having a web segment with a flow channel communicating with said oil feed passage and a tubular segment surrounding said second shaft and defining an annular chamber communicating with said flow channel, wherein said annular chamber is in fluid communication with said clutch fee chamber.

14. The transfer case of claim 13 wherein said transfer mechanism includes a first sprocket drivingly coupled to said first shaft, a second sprocket rotatably supported on said second shaft, and a power chain encircling said first and second sprockets for transferring drive torque from said first shaft to said second sprocket, wherein said first clutch member is a clutch drum fixed for rotation with said second sprocket and said second clutch member is a clutch hub fixed for rotation with said second shaft, and wherein said oil catcher reservoir includes a first inlet port configured to catch lubricant splashed upon rotation of said clutch drum and a second inlet port configured to catch lubricant splashed upon rotation of said power chain and/or said second sprocket.

15. The transfer case of claim 13 wherein said power-operated clutch actuator includes a ballramp unit having a first cam ring and a second cam ring that is axially moveable relative to said first cam ring, wherein said web segment of said oil conduit is connected to said first cam ring, and wherein said tubular segment of said oil conduit is disposed between said second shaft and said second cam ring.

16. The transfer case of claim 15 further comprising a flow control device operable to regulate the flow of lubricant from said annular chamber of said oil conduit into said clutch feed chamber, and wherein movement of said second cam ring causes operation of said flow control device so as to meter the amount of lubricant flowing from said annular chamber into said clutch feed chamber.

17. The transfer case of claim 16 wherein said splash recovery lubrication system further includes a flow restrictor ring disposed within said annular chamber and having at least one flow aperture, wherein movement of said flow control device in response to movement of said second cam ring regulates the flow of lubricant through said flow aperture, wherein said clutch flow control device includes a shroud segment and a radial flange segment having a window aperture, wherein said shroud segment surrounds said tubular segment of said oil conduit, wherein said radial flange segment overlies an end portion of said tubular segment of said oil conduit and encloses said annular chamber, and wherein radial movement of said clutch flow control device causes said window aperture to align with said flow aperture to permit flow of lubricant into said clutch feed chamber.

18. The transfer case of claim 17 wherein said splash recovery clutch lubrication system further includes a clutch feed cover having a funnel section surrounding said shroud segment of said clutch flow control device and a radial plate segment, and a clutch feed device drivingly coupled for rotation with said second shaft, wherein said clutch feed device includes a ring segment fixed to said plate segment of said clutch flow control device so as to define said clutch feed chamber therebetween.

19. The transfer case of claim 18 wherein said clutch feed device further includes a plurality of tubular conduits extending axially from said ring segment and retained in apertures formed in said second clutch plates, said conduits each having radial discharge ports for transmitting lubricant from said clutch feed chamber radially outwardly into said clutch pack, and wherein said clutch feed device further includes drive lugs extending from said ring segment and which are coupled for common rotation with said second shaft.

20. The transfer case of claim 13 wherein said oil catcher reservoir is disposed above said friction clutch assembly, wherein said oil feed reservoir is disposed above said clutch actuator, and wherein said clutch assembly is at least partially disposed for rotation within said sump of lubricant.

21. A transfer case for use in a four-wheel drive motor vehicle having a powertrain and front and rear drivelines, the transfer case comprising:

a housing defining an internal sump area filled with a lubricant;

an input shaft rotatably supported in said housing and adapted to receive drive torque from the powertrain;

a rear output shaft rotatably supported in said housing and configured to selectively transmit drive torque from said input shaft to the rear driveline;

a front output shaft rotatably supported in said housing and configured to selectively transmit drive torque from said rear output shaft to the front driveline;

a transfer mechanism including a first sprocket fixed for rotation with said rear output shaft, a second sprocket rotatably supported on said front output shaft, and a power chain encircling said first and second sprockets for drivingly connecting said second sprocket for rotation with said first sprocket;

a reduction gearset disposed between said input shaft and said rear output shaft;

a range clutch operable in a first range mode to establish a direct ratio drive connection between said input shaft and said rear output shaft and further operable in a second range mode to engage said reduction gearset and establish a reduced ratio drive connection between said input shaft and said rear output shaft;

a range actuator operable for selectively shifting said range clutch between its first and second range modes;

a friction clutch assembly surrounding said front output shaft and including a clutch drum fixed for rotation with said second sprocket, a multi-plate clutch pack, and an apply plate, said multi-plate clutch pack including a plurality of outer clutch plates coupled for rotation with said clutch drum and which are alternatively interleaved with a plurality of inner clutch plates coupled for rotation with said front output shaft, said apply plate being moveable relative to said clutch pack between a first position disengaged from said clutch pack to establish a released mode for said friction clutch assembly and a second position engaged with said clutch pack to establish a torque transfer mode for said friction clutch assembly;
a mode actuator operable for moving said apply plate between its first and second mode positions so as to control the amount of drive torque transmitted from said rear output shaft through said transfer mechanism and said friction clutch assembly to said front output shaft; and
a splash recovery lubrication system for capturing lubricant splashed from said sump in response to rotation of at least one of said second sprocket, said power chain and said clutch drum and feeding said captured lubricant to a clutch feed chamber that is in fluid communication with said clutch pack, said lubrication system comprising: an oil catcher reservoir configured to catch said splashed lubricant and retain said captured lubricant in an oil catcher cavity; an oil feed reservoir having an oil feed cavity communicating with said oil catcher cavity and an oil feed passage; an oil conduct having a radial web segment defining a flow channel in fluid communication with said oil feed passage, and a tubular segment surrounding said front output shaft and defining an annular flow chamber communicating with said flow channel; and a clutch feed device coupled for rotation with said front output shaft and having a plurality of tubular conduits extending through window apertures in said inner clutch plates, each of said tubular conduits defining an internal flow passage communicating with said annular chamber and having discharge ports configured to permit lubricant to be supplied to said clutch feed chamber to lubricate said clutch pack.

* * * * *